United States Patent
Bauman et al.

(10) Patent No.: US 10,564,704 B2
(45) Date of Patent: *Feb. 18, 2020

(54) SYSTEMS AND METHODS FOR FACILITATING LOW POWER ON A NETWORK-ON-CHIP

(71) Applicant: NetSpeed Systems, Inc., San Jose, CA (US)

(72) Inventors: James A. Bauman, Los Gatos, CA (US); Joe Rowlands, San Jose, CA (US); Sailesh Kumar, San Jose, CA (US)

(73) Assignee: NetSpeed Systems, Inc., Santa Jose, CA (US)

(*) Notice: Subject to any disclaimer, the term of this patent is extended or adjusted under 35 U.S.C. 154(b) by 83 days.

This patent is subject to a terminal disclaimer.

(21) Appl. No.: 15/903,462

(22) Filed: Feb. 23, 2018

(65) Prior Publication Data

US 2018/0181192 A1 Jun. 28, 2018

Related U.S. Application Data

(63) Continuation of application No. 15/701,305, filed on Sep. 11, 2017, now Pat. No. 10,452,124.

(Continued)

(51) Int. Cl.
*G06F 1/32* (2019.01)
*G06F 15/78* (2006.01)
*G06F 1/3287* (2019.01)

(52) U.S. Cl.
CPC ........ *G06F 1/3287* (2013.01); *G06F 15/7825* (2013.01)

(58) Field of Classification Search
CPC .................... G06F 1/3287; G06F 15/7825
See application file for complete search history.

(56) References Cited

U.S. PATENT DOCUMENTS

| | | |
|---|---|---|
| 4,409,838 A | 10/1983 | Schomberg |
| 4,933,933 A | 6/1990 | Dally et al. |

(Continued)

FOREIGN PATENT DOCUMENTS

| | | |
|---|---|---|
| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Stefan Stoynov
(74) *Attorney, Agent, or Firm* — Spectrum IP Law Group LLC

(57) ABSTRACT

Aspects of the present disclosure are directed to a power specification and Network on Chip (NoC) having a power supervisor (PS) unit. The specification is utilized to generate a NoC with power domains and clock domains. The PS is configured with one or more power domain finite state machines (PDFSMs) that drive signaling for the power domains of the NoC, and is configured to power the NoC elements of the power domain on or off. NoC elements are configured to conduct fencing or draining operations to facilitate the power state transitions.

12 Claims, 21 Drawing Sheets

Related U.S. Application Data

(60) Provisional application No. 62/393,465, filed on Sep. 12, 2016.

(56) References Cited

U.S. PATENT DOCUMENTS

| | | | |
|---|---|---|---|
| 5,105,424 A | 4/1992 | Flaig et al. | |
| 5,163,016 A | 11/1992 | Har'El et al. | |
| 5,355,455 A | 10/1994 | Hilgendorf et al. | |
| 5,432,785 A | 7/1995 | Ahmed et al. | |
| 5,563,003 A | 10/1996 | Suzuki et al. | |
| 5,583,990 A | 12/1996 | Birrittella et al. | |
| 5,588,152 A | 12/1996 | Dapp et al. | |
| 5,764,740 A | 6/1998 | Holender | |
| 5,790,554 A | 8/1998 | Pitcher et al. | |
| 5,859,981 A | 1/1999 | Levin et al. | |
| 5,991,308 A | 11/1999 | Fuhrmann et al. | |
| 5,999,530 A | 12/1999 | LeMaire et al. | |
| 6,003,029 A | 12/1999 | Agrawal et al. | |
| 6,029,220 A | 2/2000 | Iwamura et al. | |
| 6,058,385 A | 5/2000 | Koza et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |
| 6,377,543 B1 | 4/2002 | Grover et al. | |
| 6,415,282 B1 | 7/2002 | Mukherjea et al. | |
| 6,674,720 B1 | 1/2004 | Passint et al. | |
| 6,701,361 B1 | 3/2004 | Meier | |
| 6,711,717 B2 | 3/2004 | Nystrom et al. | |
| 6,778,531 B1 | 8/2004 | Kodialam et al. | |
| 6,925,627 B1 | 8/2005 | Longway et al. | |
| 6,967,926 B1 | 11/2005 | Williams, Jr. et al. | |
| 6,983,461 B2 | 1/2006 | Hutchison et al. | |
| 7,046,633 B2 | 5/2006 | Carvey | |
| 7,065,730 B2 | 6/2006 | Alpert et al. | |
| 7,143,221 B2 | 11/2006 | Bruce et al. | |
| 7,318,214 B1 | 1/2008 | Prasad et al. | |
| 7,379,424 B1 | 5/2008 | Krueger | |
| 7,437,518 B2 | 10/2008 | Tsien | |
| 7,461,236 B1 | 12/2008 | Wentzlaff | |
| 7,509,619 B1 | 3/2009 | Miller et al. | |
| 7,564,865 B2 | 7/2009 | Radulescu | |
| 7,583,602 B2 | 9/2009 | Bejerano et al. | |
| 7,590,959 B2 | 9/2009 | Tanaka | |
| 7,693,064 B2 | 4/2010 | Thubert et al. | |
| 7,701,252 B1 | 4/2010 | Chow et al. | |
| 7,724,735 B2 | 5/2010 | Locatelli et al. | |
| 7,725,859 B1 | 5/2010 | Lenahan et al. | |
| 7,774,783 B2 | 8/2010 | Toader | |
| 7,808,968 B1 | 10/2010 | Kalmanek, Jr. et al. | |
| 7,853,774 B1 | 12/2010 | Wentzlaff | |
| 7,917,885 B2 | 3/2011 | Becker | |
| 7,957,381 B2 | 6/2011 | Clermidy et al. | |
| 7,973,804 B2 | 7/2011 | Mejdrich et al. | |
| 8,018,249 B2 | 9/2011 | Koch et al. | |
| 8,020,163 B2 | 9/2011 | Nollet et al. | |
| 8,020,168 B2 | 9/2011 | Hoover et al. | |
| 8,050,256 B1 | 11/2011 | Bao et al. | |
| 8,059,551 B2 | 11/2011 | Milliken | |
| 8,098,677 B1 | 1/2012 | Pleshek et al. | |
| 8,099,757 B2 | 1/2012 | Riedle et al. | |
| 8,136,071 B2 | 3/2012 | Solomon | |
| 8,190,931 B2 | 5/2012 | Laurenti et al. | |
| 8,203,938 B2 | 6/2012 | Gibbings | |
| 8,261,025 B2 | 9/2012 | Mejdrich et al. | |
| 8,281,297 B2 | 10/2012 | Dasu et al. | |
| 8,306,042 B1 | 11/2012 | Abts | |
| 8,312,402 B1 | 11/2012 | Okhmatovski et al. | |
| 8,352,774 B2 | 1/2013 | Elrabaa | |
| 8,407,425 B2 | 3/2013 | Gueron et al. | |
| 8,412,795 B2 | 4/2013 | Mangano et al. | |
| 8,438,578 B2 | 5/2013 | Hoover et al. | |
| 8,448,102 B2 | 5/2013 | Komachuk et al. | |
| 8,490,110 B2 | 7/2013 | Hoover et al. | |
| 8,492,886 B2 | 7/2013 | Or-Bach et al. | |
| 8,503,445 B2 | 8/2013 | Lo | |
| 8,514,889 B2 | 8/2013 | Jayasimha | |
| 8,541,819 B1 | 9/2013 | Or-Bach et al. | |
| 8,543,964 B2 | 9/2013 | Ge et al. | |
| 8,572,353 B1 | 10/2013 | Bratt et al. | |
| 8,601,423 B1 | 12/2013 | Philip et al. | |
| 8,614,955 B2 | 12/2013 | Gintis et al. | |
| 8,619,622 B2 | 12/2013 | Harrand et al. | |
| 8,635,577 B2 | 1/2014 | Kazda et al. | |
| 8,661,455 B2 | 2/2014 | Mejdrich et al. | |
| 8,667,439 B1 | 3/2014 | Kumar et al. | |
| 8,705,368 B1 | 4/2014 | Abts et al. | |
| 8,711,867 B2 | 4/2014 | Guo et al. | |
| 8,717,875 B2 | 5/2014 | Bejerano et al. | |
| 8,726,047 B2 * | 5/2014 | Lee | G06F 1/26 713/300 |
| 8,726,295 B2 | 5/2014 | Hoover et al. | |
| 8,738,860 B1 | 5/2014 | Griffin et al. | |
| 8,793,644 B2 | 7/2014 | Michel et al. | |
| 8,798,038 B2 | 8/2014 | Jayasimha et al. | |
| 8,819,611 B2 | 8/2014 | Philip et al. | |
| 8,885,510 B2 | 11/2014 | Kumar et al. | |
| 8,930,664 B2 | 1/2015 | Kulmala et al. | |
| 9,210,048 B1 | 12/2015 | Marr et al. | |
| 9,223,711 B2 | 12/2015 | Philip et al. | |
| 9,244,845 B2 | 1/2016 | Rowlands et al. | |
| 9,244,880 B2 | 1/2016 | Philip et al. | |
| 9,253,085 B2 | 2/2016 | Kumar et al. | |
| 9,294,354 B2 | 3/2016 | Kumar | |
| 9,319,232 B2 | 4/2016 | Kumar | |
| 9,444,702 B1 | 9/2016 | Raponi et al. | |
| 9,471,726 B2 | 10/2016 | Kumar et al. | |
| 9,473,359 B2 | 10/2016 | Kumar et al. | |
| 9,473,388 B2 | 10/2016 | Kumar et al. | |
| 9,473,415 B2 | 10/2016 | Kumar | |
| 9,477,280 B1 | 10/2016 | Gangwar et al. | |
| 9,529,400 B1 | 12/2016 | Kumar et al. | |
| 9,529,948 B2 | 12/2016 | De et al. | |
| 9,535,848 B2 | 1/2017 | Rowlands et al. | |
| 9,568,970 B1 | 2/2017 | Kaushal et al. | |
| 9,569,579 B1 | 2/2017 | Kumar | |
| 9,571,341 B1 | 2/2017 | Kumar et al. | |
| 9,571,402 B2 | 2/2017 | Kumar et al. | |
| 9,571,420 B2 | 2/2017 | Kumar | |
| 9,590,813 B1 | 3/2017 | Kumar et al. | |
| 9,660,942 B2 | 5/2017 | Kumar | |
| 9,699,079 B2 | 7/2017 | Chopra et al. | |
| 9,742,630 B2 | 8/2017 | Philip et al. | |
| 2002/0071392 A1 | 6/2002 | Grover et al. | |
| 2002/0073380 A1 | 6/2002 | Cooke et al. | |
| 2002/0083159 A1 | 6/2002 | Ward et al. | |
| 2002/0095430 A1 | 7/2002 | Egilsson et al. | |
| 2002/0150094 A1 | 10/2002 | Cheng et al. | |
| 2003/0005149 A1 | 1/2003 | Haas et al. | |
| 2003/0088602 A1 | 5/2003 | Dutta et al. | |
| 2003/0145314 A1 | 7/2003 | Nguyen et al. | |
| 2003/0200315 A1 | 10/2003 | Goldenberg et al. | |
| 2004/0006584 A1 | 1/2004 | Vandeweerd | |
| 2004/0019814 A1 | 1/2004 | Pappalardo et al. | |
| 2004/0049565 A1 | 3/2004 | Keller et al. | |
| 2004/0103218 A1 | 5/2004 | Blumrich et al. | |
| 2004/0156376 A1 | 8/2004 | Nakagawa | |
| 2004/0156383 A1 | 8/2004 | Nakagawa et al. | |
| 2004/0216072 A1 | 10/2004 | Alpert et al. | |
| 2005/0147081 A1 | 7/2005 | Acharya et al. | |
| 2005/0203988 A1 | 9/2005 | Nollet et al. | |
| 2005/0228930 A1 | 10/2005 | Ning et al. | |
| 2005/0286543 A1 | 12/2005 | Coppola et al. | |
| 2006/0002303 A1 | 1/2006 | Bejerano et al. | |
| 2006/0031615 A1 | 2/2006 | Bruce et al. | |
| 2006/0053312 A1 | 3/2006 | Jones et al. | |
| 2006/0075169 A1 | 4/2006 | Harris et al. | |
| 2006/0104274 A1 | 5/2006 | Caviglia et al. | |
| 2006/0161875 A1 | 7/2006 | Rhee | |
| 2006/0206297 A1 | 9/2006 | Ishiyama et al. | |
| 2006/0209846 A1 | 9/2006 | Clermidy et al. | |
| 2006/0268909 A1 | 11/2006 | Langevin et al. | |
| 2007/0038987 A1 | 2/2007 | Ohara et al. | |
| 2007/0088537 A1 | 4/2007 | Lertora et al. | |

(56) References Cited

U.S. PATENT DOCUMENTS

| | | |
|---|---|---|
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0057896 A1* | 3/2008 | Kim ................ G06F 1/3203 455/187.1 |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0157976 A1 | 6/2009 | Comparan et al. |
| 2009/0172304 A1 | 7/2009 | Gueron et al. |
| 2009/0182944 A1 | 7/2009 | Comparan et al. |
| 2009/0182954 A1 | 7/2009 | Mejdrich et al. |
| 2009/0182986 A1 | 7/2009 | Schwinn et al. |
| 2009/0182987 A1 | 7/2009 | Mejdrich et al. |
| 2009/0187716 A1 | 7/2009 | Comparan et al. |
| 2009/0187734 A1 | 7/2009 | Mejdrich et al. |
| 2009/0187756 A1 | 7/2009 | Nollet et al. |
| 2009/0201302 A1 | 8/2009 | Hoover et al. |
| 2009/0210184 A1 | 8/2009 | Medardoni et al. |
| 2009/0210883 A1 | 8/2009 | Hoover et al. |
| 2009/0228681 A1 | 9/2009 | Mejdrich et al. |
| 2009/0228682 A1 | 9/2009 | Mejdrich et al. |
| 2009/0228689 A1 | 9/2009 | Muff et al. |
| 2009/0228690 A1 | 9/2009 | Muff et al. |
| 2009/0231348 A1 | 9/2009 | Mejdrich et al. |
| 2009/0231349 A1 | 9/2009 | Mejdrich et al. |
| 2009/0240920 A1 | 9/2009 | Muff et al. |
| 2009/0245257 A1 | 10/2009 | Comparan et al. |
| 2009/0256836 A1 | 10/2009 | Fowler et al. |
| 2009/0260013 A1 | 10/2009 | Heil et al. |
| 2009/0268677 A1 | 10/2009 | Chou et al. |
| 2009/0271172 A1 | 10/2009 | Mejdrich et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0292907 A1 | 11/2009 | Schwinn et al. |
| 2009/0293061 A1 | 11/2009 | Schwinn et al. |
| 2009/0300292 A1 | 12/2009 | Fang et al. |
| 2009/0300335 A1 | 12/2009 | Muff et al. |
| 2009/0307714 A1 | 12/2009 | Hoover et al. |
| 2009/0313592 A1 | 12/2009 | Murali et al. |
| 2009/0315908 A1 | 12/2009 | Comparan et al. |
| 2010/0023568 A1 | 1/2010 | Hickey et al. |
| 2010/0031009 A1 | 2/2010 | Muff et al. |
| 2010/0040162 A1 | 2/2010 | Suehiro |
| 2010/0042812 A1 | 2/2010 | Hickey et al. |
| 2010/0042813 A1 | 2/2010 | Hickey et al. |
| 2010/0070714 A1 | 3/2010 | Hoover et al. |
| 2010/0091787 A1 | 4/2010 | Muff et al. |
| 2010/0095256 A1 | 4/2010 | Kavalpati et al. |
| 2010/0100707 A1 | 4/2010 | Mejdrich et al. |
| 2010/0100712 A1 | 4/2010 | Mejdrich et al. |
| 2010/0100770 A1 | 4/2010 | Mejdrich et al. |
| 2010/0100934 A1 | 4/2010 | Mejdrich et al. |
| 2010/0106940 A1 | 4/2010 | Muff et al. |
| 2010/0125722 A1 | 5/2010 | Hickey et al. |
| 2010/0158005 A1 | 6/2010 | Mukhopadhyay et al. |
| 2010/0162019 A1 | 6/2010 | Kumar et al. |
| 2010/0189111 A1 | 7/2010 | Muff et al. |
| 2010/0191940 A1 | 7/2010 | Mejdrich et al. |
| 2010/0211718 A1 | 8/2010 | Gratz et al. |
| 2010/0223505 A1 | 9/2010 | Andreev et al. |
| 2010/0228781 A1 | 9/2010 | Fowler et al. |
| 2010/0239185 A1 | 9/2010 | Fowler et al. |
| 2010/0239186 A1 | 9/2010 | Fowler et al. |
| 2010/0242003 A1 | 9/2010 | Kwok |
| 2010/0269123 A1 | 10/2010 | Mejdrich et al. |
| 2010/0284309 A1 | 11/2010 | Allan et al. |
| 2010/0318822 A1* | 12/2010 | Scandurra ............ G06F 1/3203 713/322 |
| 2010/0333099 A1 | 12/2010 | Kupferschmidt et al. |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich et al. |
| 2011/0292063 A1 | 11/2011 | Mejdrich et al. |
| 2011/0302345 A1 | 12/2011 | Boucard et al. |
| 2011/0302450 A1 | 12/2011 | Hickey et al. |
| 2011/0307734 A1 | 12/2011 | Boesen et al. |
| 2011/0316864 A1 | 12/2011 | Mejdrich et al. |
| 2011/0320719 A1 | 12/2011 | Mejdrich et al. |
| 2011/0320724 A1 | 12/2011 | Mejdrich et al. |
| 2011/0320771 A1 | 12/2011 | Mejdrich et al. |
| 2011/0320854 A1 | 12/2011 | Elrabaa |
| 2011/0320991 A1 | 12/2011 | Hsu et al. |
| 2011/0321057 A1 | 12/2011 | Mejdrich et al. |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks et al. |
| 2012/0072635 A1 | 3/2012 | Yoshida et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0176364 A1 | 7/2012 | Schardt et al. |
| 2012/0195321 A1 | 8/2012 | Ramanujam et al. |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel et al. |
| 2012/0260252 A1 | 10/2012 | Kuesel et al. |

(56) References Cited

U.S. PATENT DOCUMENTS

| | | |
|---|---|---|
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0036296 A1 | 2/2013 | Hickey et al. |
| 2013/0044117 A1 | 2/2013 | Mejdrich et al. |
| 2013/0046518 A1 | 2/2013 | Mejdrich et al. |
| 2013/0051397 A1 | 2/2013 | Guo et al. |
| 2013/0054811 A1 | 2/2013 | Harrand |
| 2013/0073771 A1 | 3/2013 | Hanyu et al. |
| 2013/0073878 A1 | 3/2013 | Jayasimha et al. |
| 2013/0080073 A1 | 3/2013 | de Corral |
| 2013/0080671 A1 | 3/2013 | Ishii et al. |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0111190 A1 | 5/2013 | Muff et al. |
| 2013/0111242 A1 | 5/2013 | Heller et al. |
| 2013/0117543 A1 | 5/2013 | Venkataramanan et al. |
| 2013/0138925 A1 | 5/2013 | Hickey et al. |
| 2013/0145128 A1 | 6/2013 | Schardt et al. |
| 2013/0148506 A1 | 6/2013 | Lea |
| 2013/0151215 A1 | 6/2013 | Mustapha |
| 2013/0159668 A1 | 6/2013 | Muff et al. |
| 2013/0159669 A1 | 6/2013 | Comparan et al. |
| 2013/0159674 A1 | 6/2013 | Muff et al. |
| 2013/0159675 A1 | 6/2013 | Muff et al. |
| 2013/0159676 A1 | 6/2013 | Muff et al. |
| 2013/0159944 A1 | 6/2013 | Uno et al. |
| 2013/0160026 A1 | 6/2013 | Kuesel et al. |
| 2013/0160114 A1 | 6/2013 | Greenwood et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich et al. |
| 2013/0191572 A1 | 7/2013 | Nooney et al. |
| 2013/0191600 A1 | 7/2013 | Kuesel et al. |
| 2013/0191649 A1 | 7/2013 | Muff et al. |
| 2013/0191651 A1 | 7/2013 | Muff et al. |
| 2013/0191824 A1 | 7/2013 | Muff et al. |
| 2013/0191825 A1 | 7/2013 | Muff et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton et al. |
| 2014/0143557 A1 | 5/2014 | Kuesel et al. |
| 2014/0143558 A1 | 5/2014 | Kuesel et al. |
| 2014/0149720 A1 | 5/2014 | Muff et al. |
| 2014/0164465 A1 | 6/2014 | Muff et al. |
| 2014/0164704 A1 | 6/2014 | Kuesel et al. |
| 2014/0164732 A1 | 6/2014 | Muff et al. |
| 2014/0164734 A1 | 6/2014 | Muff et al. |
| 2014/0211622 A1 | 7/2014 | Kumar et al. |
| 2014/0229709 A1 | 8/2014 | Kuesel et al. |
| 2014/0229712 A1 | 8/2014 | Muff et al. |
| 2014/0229713 A1 | 8/2014 | Muff et al. |
| 2014/0229714 A1 | 8/2014 | Muff et al. |
| 2014/0229720 A1 | 8/2014 | Hickey et al. |
| 2014/0230077 A1 | 8/2014 | Muff et al. |
| 2014/0232188 A1 | 8/2014 | Cheriyan et al. |
| 2014/0241376 A1 | 8/2014 | Balkan et al. |
| 2014/0254388 A1 | 9/2014 | Kumar et al. |
| 2014/0281243 A1 | 9/2014 | Shalf et al. |
| 2014/0281402 A1 | 9/2014 | Comparan et al. |
| 2014/0307590 A1 | 10/2014 | Dobbelaere et al. |
| 2014/0359641 A1 | 12/2014 | Clark et al. |
| 2014/0376569 A1 | 12/2014 | Philip et al. |
| 2015/0020078 A1 | 1/2015 | Kuesel et al. |
| 2015/0026435 A1 | 1/2015 | Muff et al. |
| 2015/0026494 A1 | 1/2015 | Bainbridge et al. |
| 2015/0026500 A1 | 1/2015 | Muff et al. |
| 2015/0032988 A1 | 1/2015 | Muff et al. |
| 2015/0032999 A1 | 1/2015 | Muff et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia et al. |
| 2015/0381707 A1 | 12/2015 | How |
| 2017/0061053 A1 | 3/2017 | Kumar et al. |
| 2017/0063625 A1 | 3/2017 | Philip et al. |
| 2017/0063697 A1 | 3/2017 | Kumar |
| 2018/0074572 A1 | 3/2018 | Bauman et al. |
| 2018/0181190 A1 | 6/2018 | Bauman et al. |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), 14 pages.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, 10 pages.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA Memo 129, May 24, 2011, 21 pgs.

(56) References Cited

OTHER PUBLICATIONS

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B., et al., CoQoS: Coordinating QoS-Aware Shared Resources in NoC-based SoCs, J. Parallel Distrib. Comput., 71 (5), May 2011, 14 pages.
Lin, S., et al., Scalable Connection-Based Flow Control Scheme for Application-Specific Network-on-Chip, The Journal of China Universities of Posts and Telecommunications, Dec. 2011, 18(6), 8 pages.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NOC: Design and Implementation of Hardware Network Interface With Improved Communication Reliability", International Journal of VLSI and Embedded Systems, IJIVES, vol. 04, Article 06116; Jun. 2013, 7 pages.
Yang, J., et al., Homogeneous NoC-based FPGA: The Foundation for Virtual FPGA, 10th IEEE International Conference on Computer and Information Technology (CIT 2010), Jun. 2010, 6 pages.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, Copyright 2002 IEEE. 0018-9162/02, 9 pages.
Sethuraman, Ranga Vemuri Balasubramanian, "optiMap: A Tool for Automated Generation of NoC Architecture Using Multi-Port Routers for FPGAs", IEEE, 6 pages, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 10 pgs.
International Search Report and Written Opinion for PCT/US2014/023625, dated Jul. 10, 2014, 9 pgs.
International Preliminary Report on Patentability for International Application No. PCT/US2013/064140, dated Apr. 14, 2015, 5 pages.
Office Action for Korean Patent Application No. 10-2016-7019093 dated Sep. 8, 2016, English translation provided, 4 pages.
Notice of Allowance for for Korean Patent Application No. 10-2016-7019093 dated Sep. 8, 2016, 5 pages.
International Search Report and Written Opinion for PCT/US2014/037902, dated Sep. 30, 2014, 14 pgs.
Office Action for Japanese Patent Application No. 2015-535898 dated Oct. 25, 2016, English translation provided, 4 pages.
Notice of Grant for Japanese Patent Application No. 2015-535898 dated Jan. 17, 2017, 3 pages.
International Search Report and Written Opinion for PCT/US2014/048190, dated Nov. 28, 2014, 11 pgs.
Office Action for Japanese Patent Application No. 2016-516030 dated Aug. 30, 2016, English translation provided, 4 pages.
Decision to Grant for Japanese Patent Application No. 2016-516030 dated Nov. 22, 2016, English translation provided, 6 pages.
Notice of Allowance received for U.S. Appl. No. 15/701,305, dated Jun. 12, 2019, 6 pages.
Office Action received for U.S. Appl. No. 15/903,396, dated Aug. 12, 2019, 7 pages.
Ex parte Quayle Action received for U.S. Appl. No. 15/903,427, mailed on Aug. 6, 2019, 5 pages.

* cited by examiner

| Base Address | Mark | Routing Info | Power Domain Dependencies |
|---|---|---|---|
| Address_1 | Mark_1 | R_Info_1 | PDD_Vector_1 |
| Address_2 | Mark_2 | R_Info_2 | PDD_Vector_2 |
| Address_3 | Mark_3 | R_Info_3 | PDD_Vector_3 |
| ... | ... | ... | ... |

FIG. 6

| Transaction ID | Valid | Power Domain Dependencies |
|---|---|---|
| Trans_ID_1 | Valid_1 | PDD_Vector_1 |
| Trans_ID_2 | Valid_2 | PDD_Vector_2 |
| Trans_ID_3 | Valid_3 | PDD_Vector_3 |
| ... | ... | ... |

FIG. 7

SYSTEMS AND METHODS FOR FACILITATING LOW POWER ON A NETWORK-ON-CHIP

CROSS-REFERENCE TO RELATED APPLICATION

This regular U.S. patent application is a continuation application of U.S. patent application Ser. No. 15/701,305, filed Sep. 11, 2017, and claims the benefit of priority under 35 U.S.C. 119 from provisional U.S. patent application No. 62/393,465, filed on Sep. 12, 2016, the entire disclosure of which is incorporated by reference herein.

BACKGROUND

Technical Field

Methods and example implementations described herein are directed to interconnect architecture, and more specifically, to Network on Chip (NoC) architectures and the design and management thereof.

Related Art

The number of components on a chip is rapidly growing due to increasing levels of integration, system complexity and shrinking transistor geometry. Complex System-on-Chips (SoCs) may involve a variety of components e.g., processor cores, Digital Signal Processors (DSPs), hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIGS. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel. The NoC interconnect is generated from a specification by utilizing design tools. The specification can contain constraints such as bandwidth/QoS/latency attributes that is to be met by the NoC, and can be in various software formats depending on the design tools utilized, Once the NoC is generated through use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present disclosure will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. Abridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Network elements of NoC generally use cut-through architecture, where arbitration of frames/flits (of a packet) for forwarding to destination port(s) starts as soon as the destination address information is retrieved from initial frames/flits of the packet. A NoC element using cut-through architecture starts forwarding the flits as soon as the destination/next hop information is available and generally blocks the output channel till the last frame/flits of the packet is forwarded. The cut-through architecture is marked as low latency, however the overall performance and resource utilization of the network elements reduces as the output channels are blocked even if it is not transmitting any data. There may be some idle cycles at the output channel due the fact that the input channel may be feeding the data at slower rate when compared with the output channel, or the input channel may have its width less than that of the output channel. In a cut-through NoC design, when multi-flit packets travel through a channel, the channel is locked for the entire duration of the packet as interleaving of multiple packets on the same channel is generally not allowed to avoid deadlock. In such cases, if packet transmission is slow, i.e. flits are not being sent every clock cycle on the channel, then the channel will be underutilized during this transmission, leading to lower NoC performance and efficiency. Slow transmission of packets on a channel may occur due to a variety of reasons, including but not limited to slow input rate, smaller channel bandwidth, channel width, traffic specification, channel bandwidth, among other like parameters. Idle cycle for a channel may occur if the transmitting agent is sending flits of a packet at a lower rate than the capacity of the channel or when less than one flit per clock cycle is being transmitted. Slow transmission of packets or idle cycle may also occur when a packet goes from a narrow channel to a wide channel, for example, when packets moves from 64-bit output channel to 128-bit channel. Idle cycle may also occur when a channel operating at low clock frequency transmits flits to a channel operating at high clock frequency. For example, when an input channel operating at 100 MHz sends a flit per 100 MHz clock cycle to an output channel operating at 200 MHz, the output channel will see a flit every alternate cycle only. Flits may arrive at lower rate at a channel if there is a performance bottleneck due to lack of flow control buffers and full throughput is not maintained on the channel.

To overcome the limitations of the cut-through scheduling architecture, store-and-forward switching architecture were proposed, where the entire packet is stored before starting routing arbitration for forwarding the packet to the destination address/next hop in the network. All frames/flits of the packets are stored in the buffer of the network element before scheduling the initial flits and subsequent flits of the packet to the next hop or destination address. To store all flits of the packet, a buffer of size equal to the longest possible packet needs to be attached with each network element, and therefore, although store-and-forward switching improves throughput rate and utilization of output network elements in some cases, it may reduce the latency of the network. It may not be a desirable option to provide a big buffer to each network element to store the longest possible packet as the average packet size may be much smaller than the longest allowed packets, and hence the part of the costly buffer would be kept idle for most of the time. Also, latency of the network element may suffer as the network element may wait for arrival of the entire packet before scheduling the packet to the next hop or destination address. Architectures can also include hybrid channels (hybrid of store-and-forward and cut-through), wherein buffer of a NoC can buffer flits of each incoming packet till its defined buffer size is full before forwarding the buffered flits to the next hop, which, although in most cases can buffer the complete packet, in certain other cases, only a part of the packet is buffered and the remaining flits of the packet are sent in the subsequent set of buffered flits, like in a cut-through architecture.

Therefore, there is a need for a method, a computer readable medium, and a NoC architecture/construction that can automatically configure some of the channels of network element as store-and-forward channels, and other channels as cut-through channels or even hybrid channels based on the NoC specification, traffic profile, bandwidth/width/frequency parameters, among other parameters so as to reduce the latency, and maintain high performance/throughput/utilization of network resources.

SUMMARY

Aspects of the present disclosure may include a method for generating a NoC having a plurality of power domains, a plurality of voltage domains, and a plurality of clock domains, wherein the method is conducted through processing of a power specification for defined power domains, voltage domains and clock domains, the power domains, voltage domains and the clock domains associated with physical locations and dynamic voltage levels/frequencies.

Aspects of the present disclosure may include a non-transitory computer readable medium, storing instructions for generating a NoC having a plurality of power domains, a plurality of voltage domains, and a plurality of clock domains, wherein the method is conducted through processing of a power specification for defined power domains, voltage domains and clock domains, the power domains, voltage domains and the clock domains associated with physical locations and dynamic voltage levels/frequencies.

Aspects of the present disclosure may further include a NoC involving a power supervisor configured to manage the Network on Chip. The power supervisor may include a plurality of power domain finite state machines for each power domain of the NoC configured to track and coordinate on/off status with SoC power management logic.

Aspects of the present disclosure may further include a power supervisor configured to manage the Network on Chip. The power supervisor may include a plurality of power domain finite state machines for each power domain of the NoC configured to track and coordinate on/off status with SoC power management logic.

Aspects of the present disclosure may further include a non-transitory computer readable medium storing instructions to execute a process for a power supervisor. The instructions may include managing a plurality of power domain finite state machines for each power domain of the NoC configured to track and coordinate on/off status with SoC power management logic.

BRIEF DESCRIPTION OF THE DRAWINGS

FIG. 6 illustrates an address table in accordance with an example implementation.

FIG. 7 illustrates an example outstanding transaction table, in accordance with an example implementation.

DETAILED DESCRIPTION

Figure 1A:
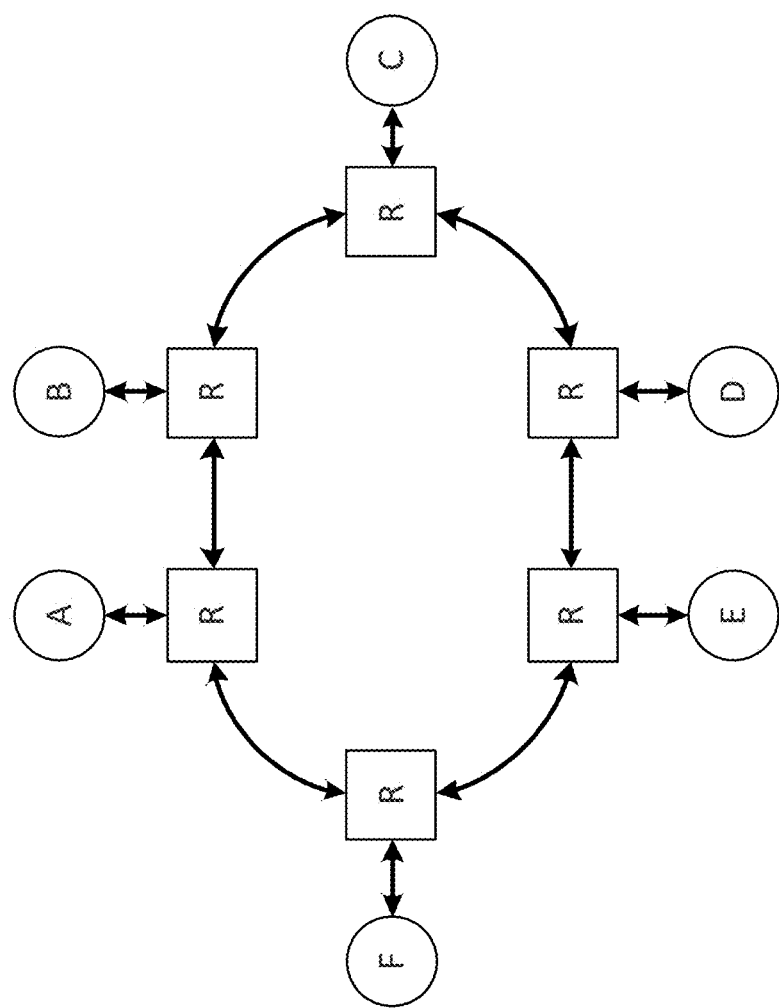
FIGS. 1(a), 1(b), 1(c) and 1(d) illustrate examples of Bidirectional ring, 2D Mesh, 2D Taurus, and 3D Mesh NoC Topologies.
Figure 1B:
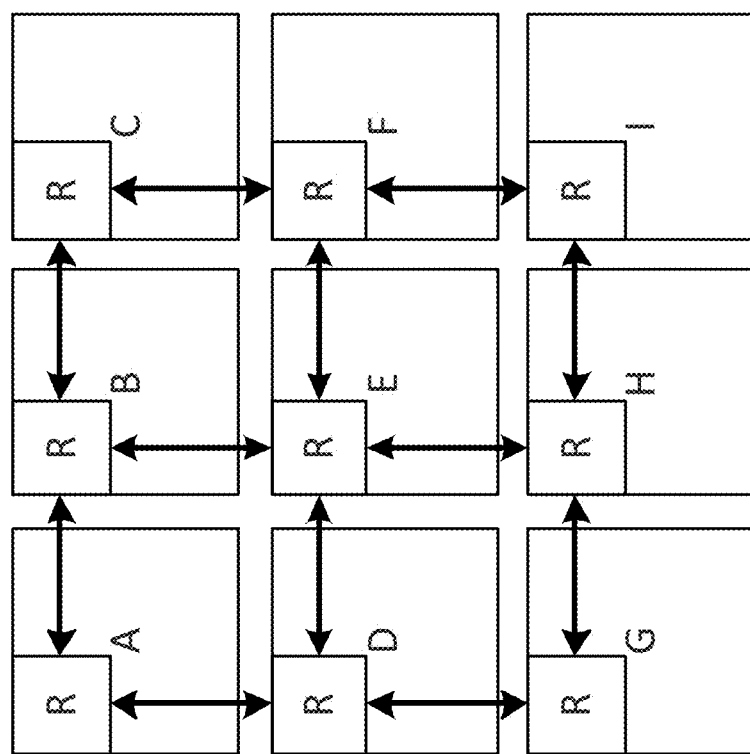
Figure 1C:
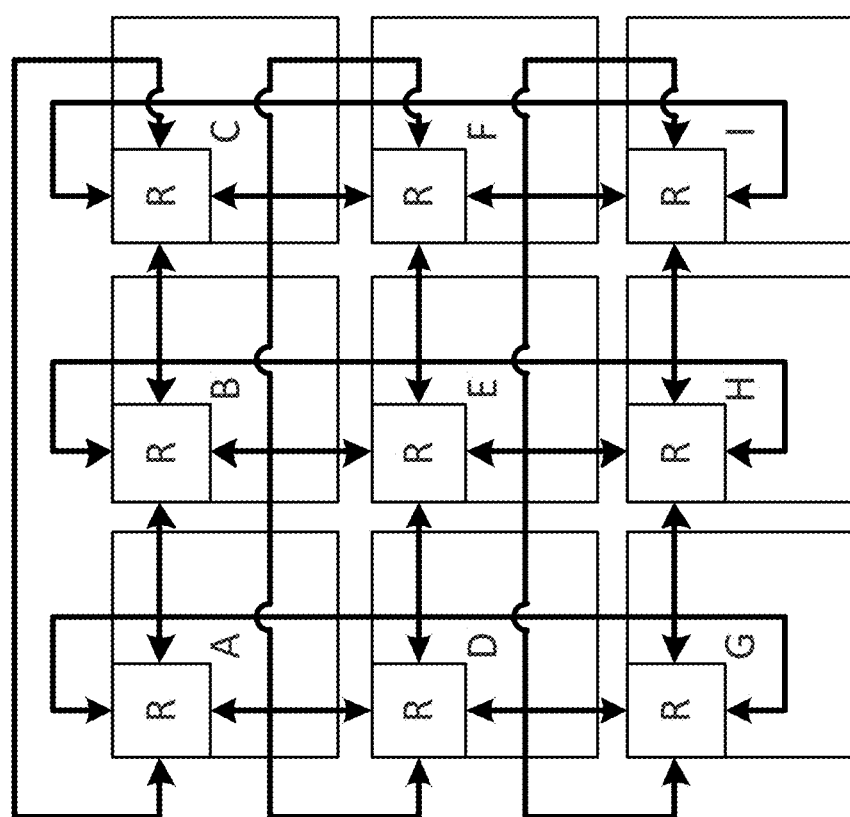
Figure 1D:
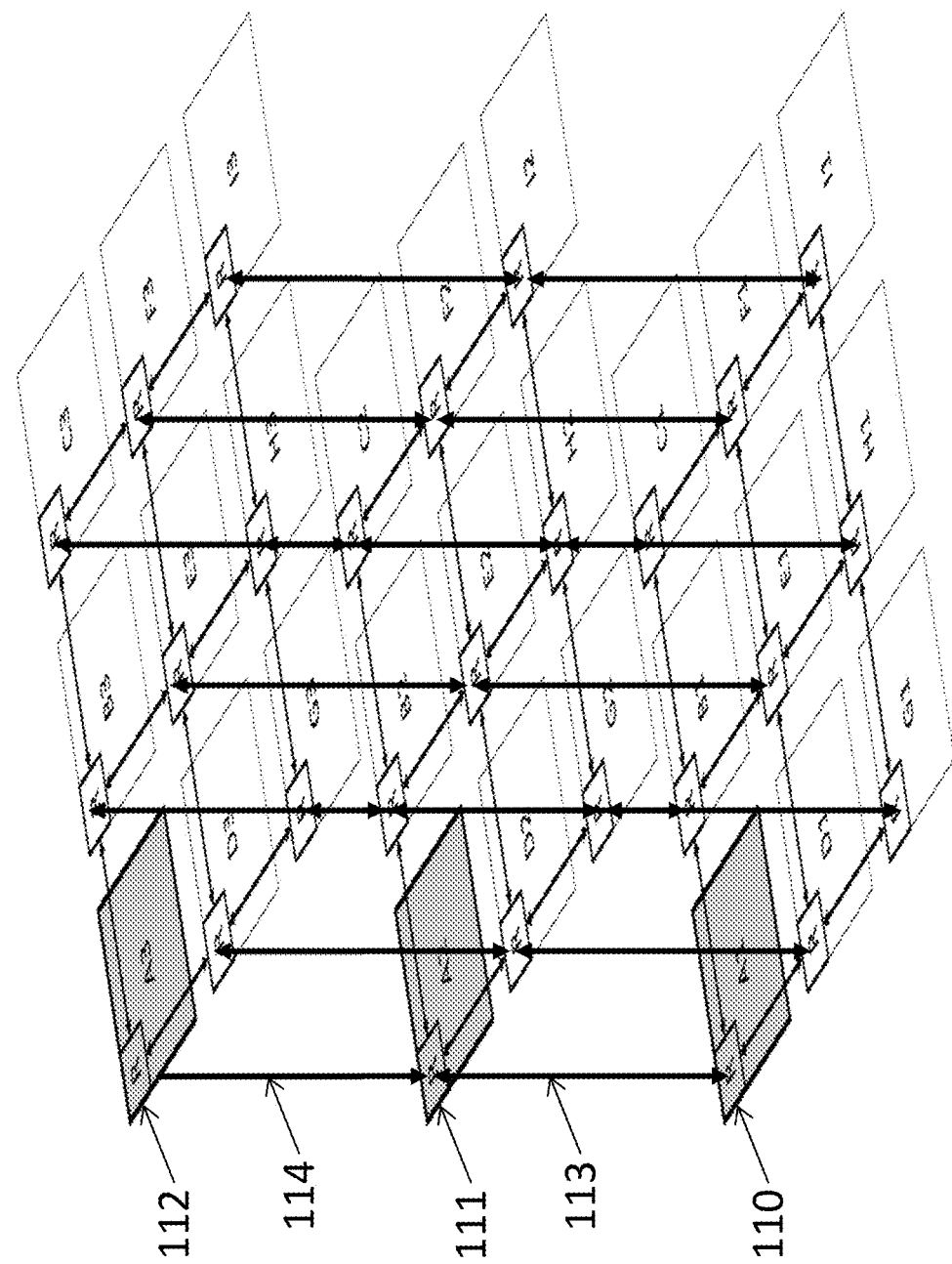
Figure 2A:
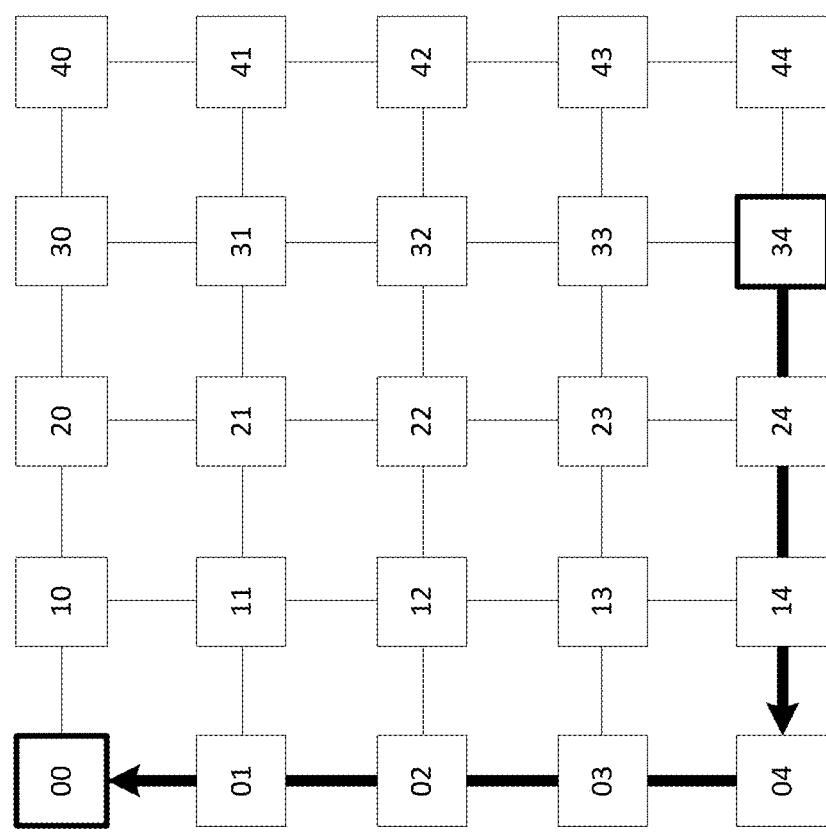
FIG. 2(a) illustrates an example of XY routing in a related art two dimensional mesh.
Figure 2B:
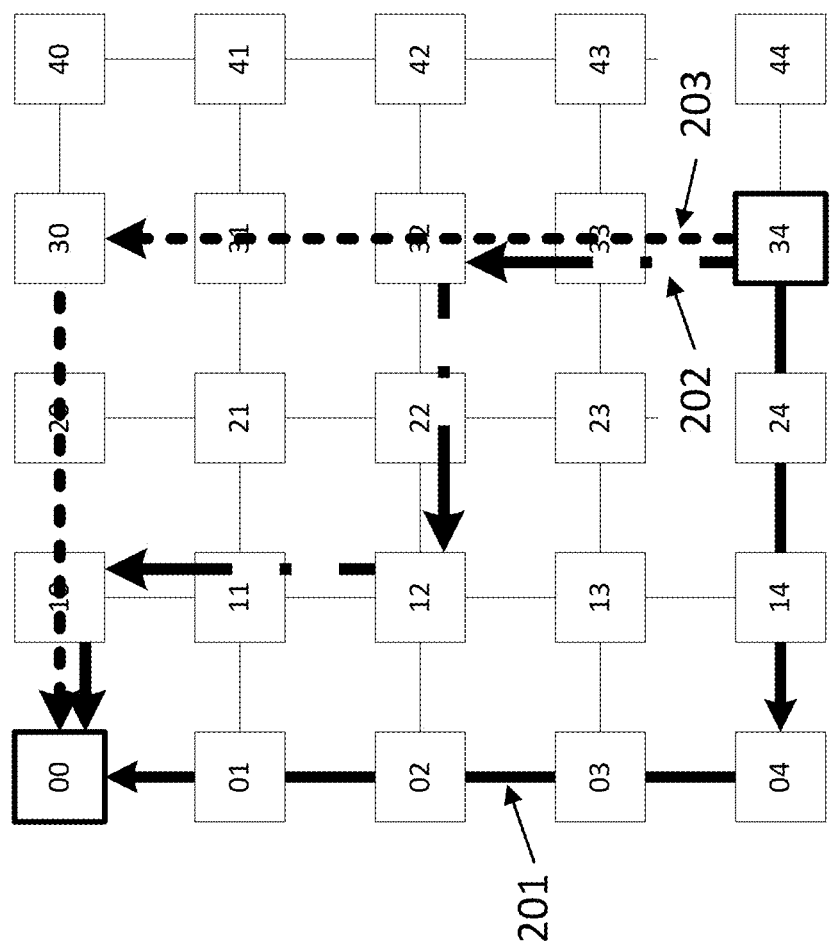
FIG. 2(b) illustrates three different routes between a source and destination nodes.
Figure 3A:
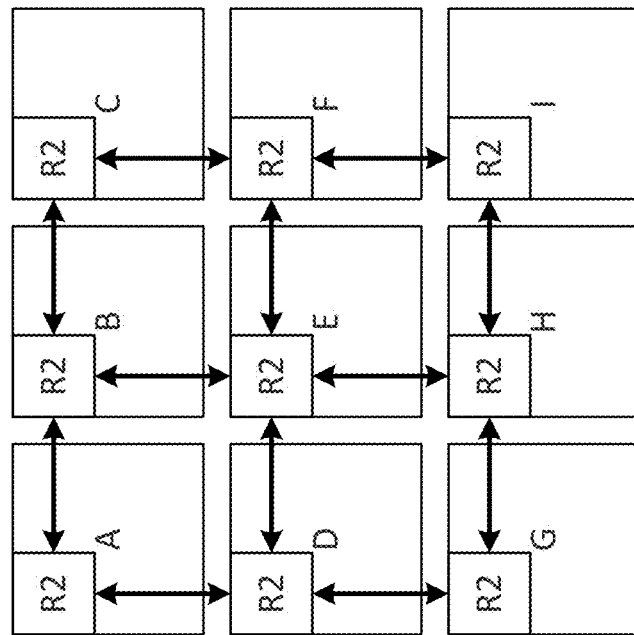
FIG. 3(a) illustrates an example of a related art two layer NoC interconnect.
Figure 3A:
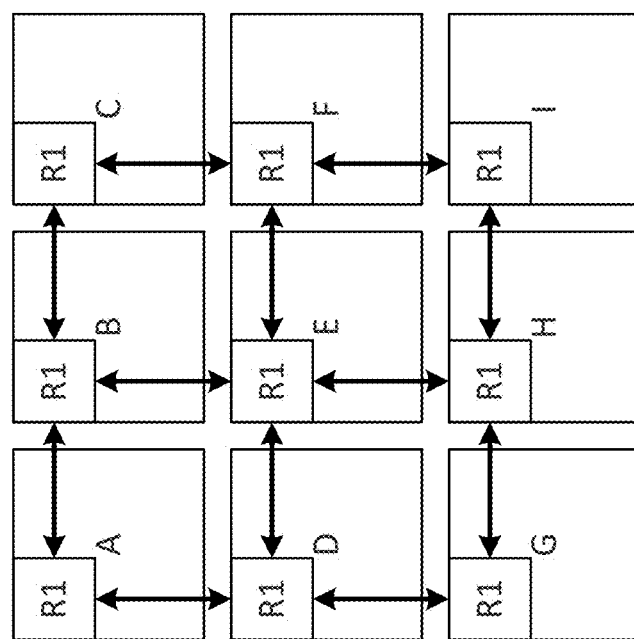
Figure 3B:
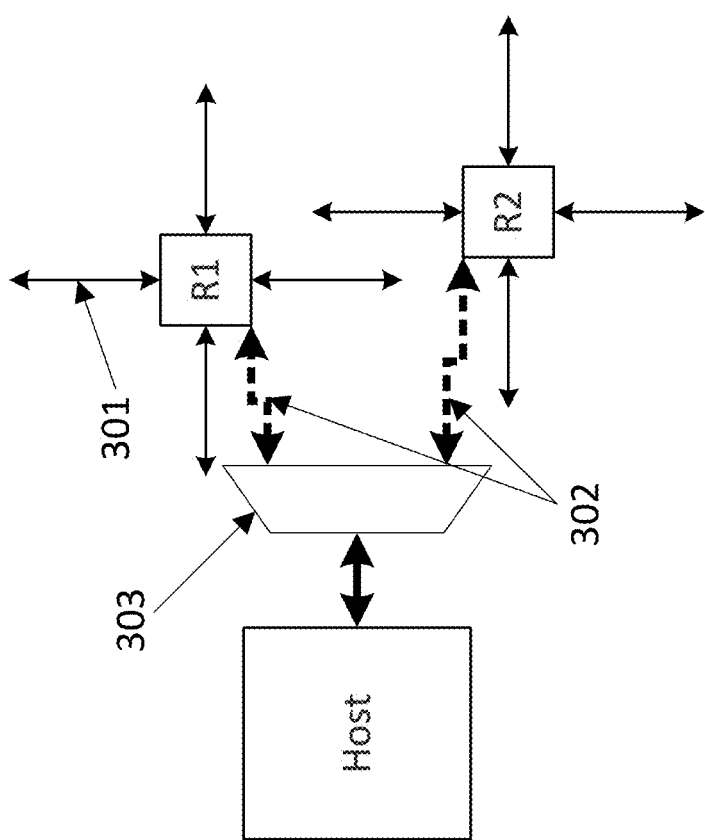
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present disclosure. Further, the example implementations described herein may be used singularly or in any combination with each other, depending on the desired implementation.

In example implementations, a NoC interconnect is generated from a specification by utilizing design tools. The specification can contain constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections and so on depending on the desired implementation. Specifications can also be in the form of power specifications to define power domains, voltage domains, clock domains, and so on, depending on the desired implementation.

Example implementations involve a power specification which can include constraints and parameters with respect to the power of the NoC. In example implementations, the power specification can define a hierarchy of components and power domains in the systems based on the NoC, and can represent the hardware boundaries. The power specification can include parameters for defining power domains, voltage domains and clock domains of the NoC, which can include the physical locations of the domains, as well as potentially dynamic voltage levels and frequencies. Example of power domain properties can include an Always_on flag to indicate that the power domain must always be on, an autowake capable flag to indicate if the power domain has autowake functionality, and associated voltage domains.

Depending on the desired implementation, the power specification may also include pre-defined power profiles, which describes distinct operating modes indicating the state of all power/voltage/clock domains in the system. The power profiles may be specified via a combination of parameters, such as a list of power domains with an explicitly specified ON/OFF state, a list of power domain dependencies (e.g., if PD A is ON, PD B must be ON, etc.), and so on. Absent pre-defined power profiles, a default power profile set of all possible combinations of power domain on/off status can be applied, according to the desired implementation.

Figure 4A:
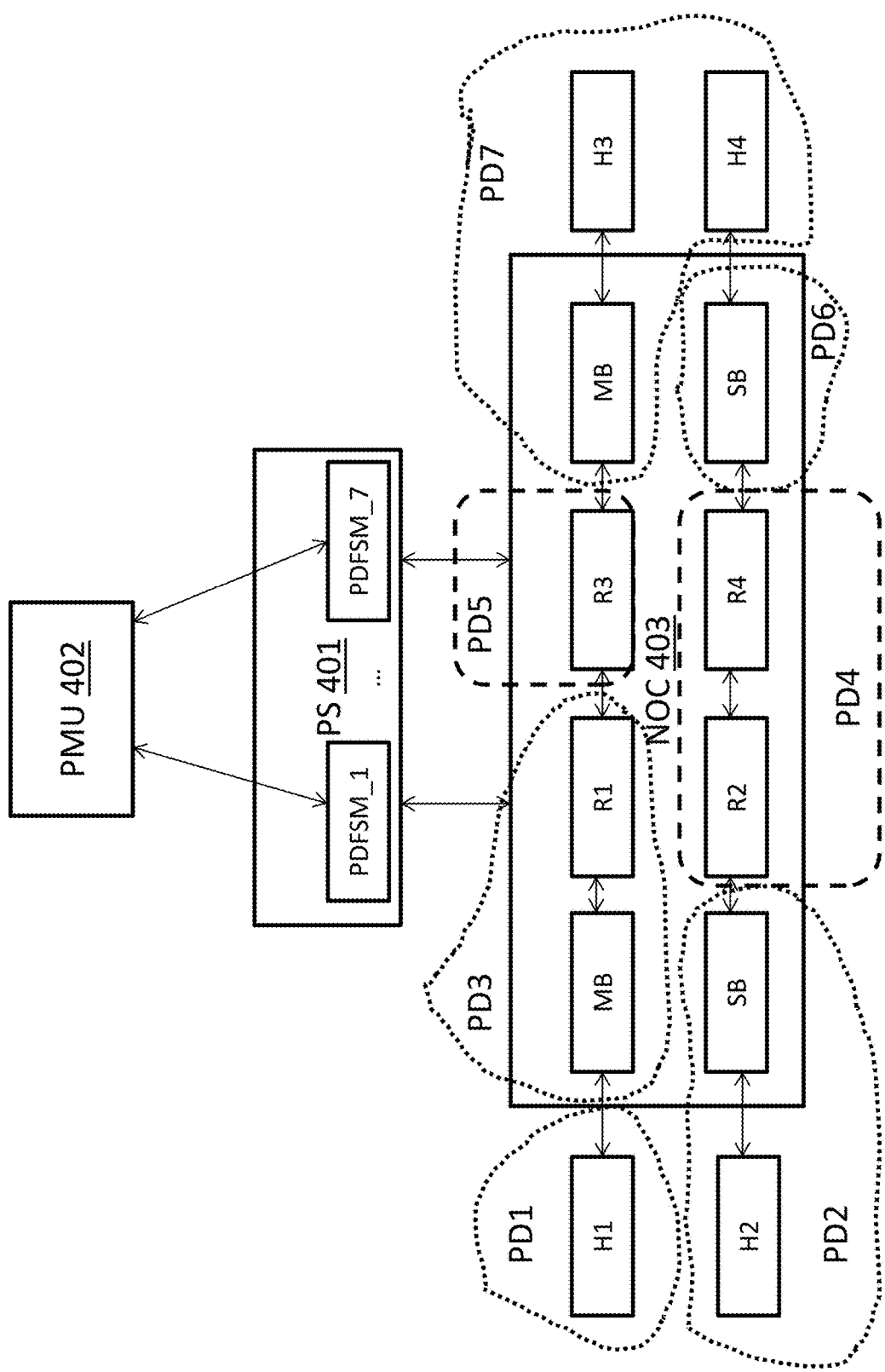
FIG. 4(a) illustrates an example NoC solution, in accordance with an example implementation.

The power specification may also include traffic flows that include described connectivity and routes, as well as optimization rules such as allow_always_on, require_autowake, and so on, depending on the desired implementation. In example implementations, the power specification is utilized to determine the power domain assignment for all NoC elements as illustrated in FIG. 4(a) to satisfy the requirements set forth in the power domain specification. The requirements may include that the generated NoC ensures uninterrupted traffic flows in each of the power profiles while meeting the optimization rules set forth in the power specification. The generation of the NoC can also include the automatic generation of industry standard power intent specification (e.g., CPF, IEEE 1801 aka UPF, etc.).

In example implementations, functionality is provided to generate traffic driven power domain state requirements for the NoC. Functionality is provided so that given a pair of power domains that are on, the functions can determine which other power domains must be on to sustain traffic flow (e.g. to avoid possible interruption of any traffic flows), or that given a traffic flow, which power domains must be on. Such functionality can be incorporated into the PS as described with respect to FIG. 4(a). Further hardware functions can be implemented within the PS so that when a power profile is given, the hardware can determine which power domains that are currently ON could be safely turned off without the possibility of interrupting traffic. Similarly, functionality can be provided such that given power profile, which power domains that are currently OFF must be turned on to avoid any possibility of interrupting traffic. Such hardware functions can also drive clock and power gating, depending on the desired implementation.

As a power management strategy, one technique that is utilized is to clock gate logic. In such implementations however, the clocks cannot be turned off for logic that is actively utilized. For example, if that logic is performing a function that is expected to be active, and the clock is stopped so that the function is stopped, then the function is broken. In example implementations, the interface to the power management unit, the Q-channel, can provide the signal indicating that the power is to be turned off, which could potentially force the power domain to be idle. In example implementations, there are fencing and draining process implementations that start halting transactions at the boundary to make sure that all transactions are completed before acknowledging the signal, to allow a portion of the logic to be in an idle state, and subsequently stop the clock safely. Such a mechanism can thereby be utilized to control clock gating.

In example implementations, power domain dependencies can be determined by a process involving the parsing of traffic flows from the specification, wherein the traffic flows are described as transactions between NoC elements (e.g. between master and slave), and then each path taken for the traffic flows are determined. For the flows traversing paths that cross power domains, the crossed power domains are identified and the traversed power domains are marked as dependencies.

FIG. 4(a) illustrates a NoC/SoC system, in accordance with an example implementation. The NoC/SoC system is defined by a power specification as provided. In FIG. 4(a), there is a Power Supervisor (PS) 401, SOC/Power management logic (PMU) 402, a NoC 403 having elements such as bridge components (e.g., slave (SB), and master bridges (MB)), and routers R1-R4. Power Domains PD1, PD2-PD8 are created, with the ones enclosed in dashed being dynamically created, dots being defined by the user. A power domain finite state machine (PDFSM) is provided for each power domain.

In an example generated NoC solution, there is a PMU 402, a PS 401 and the NoC 403 managed by the PMU 402 and PS 401. The PMU 402 is provided as a SoC power management logic for controlling the NoC 403. The PS 401 is a hardware layer that provides an interface for the customers PMU 402. The PMU 402 logic can request the change to the power status of some portion of the design that interacts with or includes some portion of the NoC, and the PS 401 is responsible for responding to that request by communicating with the various elements within the NoC 403 that will be effected by that request and ensuring that they are in safe state to support the request, ultimately acknowledging or denying that request based on the interaction here. So the overall architecture isolates the details of managing the components within the NoC 403 to a desired level of abstraction.

In example implementations, the power specification defines the power domains, voltage domains and clock domains in the NoC. Through the use of a design tool, the customer can define the physical location, voltage level, clock frequencies and other properties according to the desired implementation.

In example implementations, the interface presented to the customer can be defined in terms of power domains, so that each power domain (PD) that appears within the design has a corresponding state machine. Each power domain finite state machine (PDFSM) is associated with the control of that power domain. This interface can be a set of parallel interfaces between the power domains state machines that communicate to the power domains, and these lines implement a set of signals that fan out to the element within the NoC that provides the interface.

The interface for power management of the NoC is done on a power domain basis. For example, when transitioning between power states (e.g., power down P7), the state machines and the network will communicate with all the elements that may have dependent traffic flows. Example implementations conduct fencing and draining to put the hardware in a state where it is safe to power the selected power domain down.

In example implementations, based on power domain assignment of NoC elements, safe power profile transitions are managed at the power domain level instead at NoC element level. The power profile transitions are implemented through fencing and draining functionality later on in this. By managing power transitions at a power domain level, the status of host elements and NoC elements can be aggregated into a single power domain.

Example implementations of the present disclosure further automatically generate hardware that supports safe NoC operation in any power profile and through transitions between power profiles. In such example implementations, actions that are taken in response to power down requests. For example, when a power domain is powered down, all initiators that might be injecting traffic into the network that depend on that power domain are set to wait for the traffic to complete. When the traffic has completed successfully, the initiators are then informed that that power will be removed. In response, the initiators of the traffic initiate traffic fencing, such that newly arriving transactions at the interfaces are blocked from proceeding.

Fencing can be implemented in several ways. For example, the transaction can be completed immediately (e.g. locally in that interface with an error) or stalled with signaling goes back through the PS). In the latter case, the transaction ultimately directs the PS to issue a request to the PMU handle the new transaction. Behavior may vary depending on the timing of the transaction relative to the power state of the power domain. If the transaction arrives prior to acknowledging that power down request, the power down request is denied. If the transaction occurs after the power down request, the power supervisor (PS) initiates a wake up request to the power manager (PMU).

Fencing is done at a level where based on address of the transaction, only the transactions that are blocked by dependencies upon shut down power domains are fenced, while other transactions are allowed to proceed normally. In example implementations, the translation of the power specification can include a traffic parameter into the encoding information that can be processed to dynamically make that determination.

Thus in example implementations, the state machine for each power domain tracks and coordinates the on/off status with SoC power management logic. The state machine can be configured to signal all initiators with the current power domain status.

Responding to the state machine, the initiators can implement fencing per address range. In this example implementation, the address lookup table describes which power domains must be on for successful transmission of a transaction. The table is consulted and the result is compared against the dynamic power domain status. If any required power domain is off, the transaction is either rejected (immediate return of error response) or held while an autowake request is signaled to return required set of power domains to ON status.

In example implementations, the initiators can implement draining per address range. In such an example implementation, pending transactions and their power domain dependencies, as indicated in the address lookup, are tracked. This can be implemented as an outstanding transaction table.

Figure 4B:
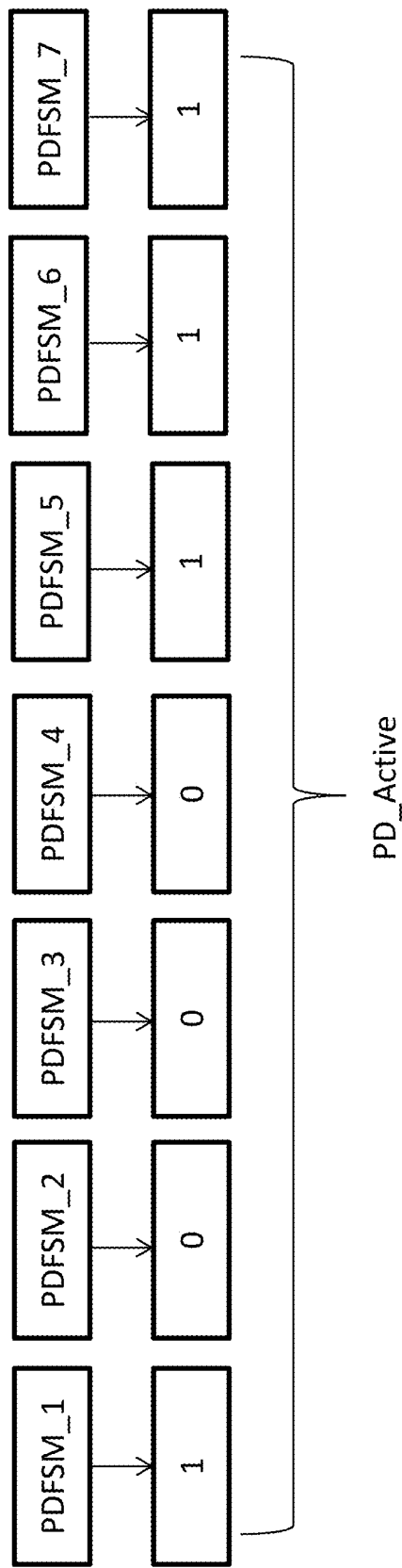
FIG. 4(b) illustrates signaling from the power domain finite state machines, in accordance with an example implementation.

FIG. 4(b) illustrates signaling from the power domain finite state machines, in accordance with an example implementation. Each of the power domain finite state machines provides a bitwise signal, with 1 indicating that the power domain is active, and 0 indicating that the power domain is not active. The signaling is aggregated together in a bit vector PD_Active to provide the status of the power domains.

Figure 5A:
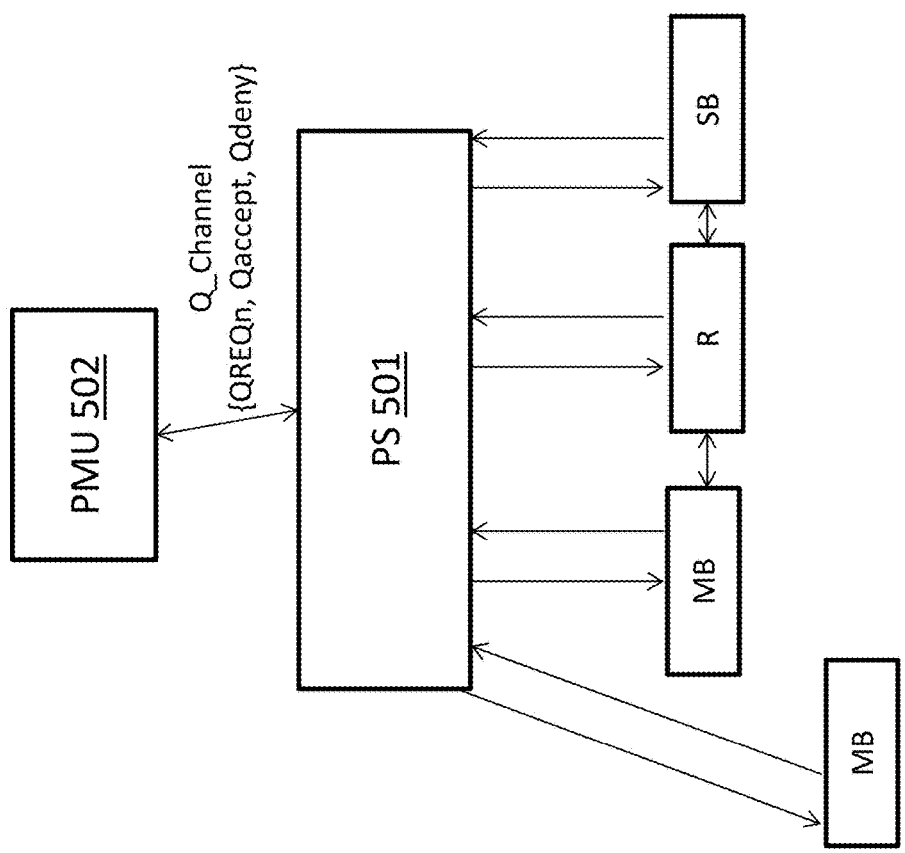
FIG. 5(a) illustrates an example architecture to drive signals from the power management unit to the master bridge, in accordance with an example implementation.

FIG. 5(a) illustrates an example architecture to drive signals from the power management unit (PMU) 502 through the power supervisor (PS) 401 to the master bridge, in accordance with an example implementation. In this example implementation, the PMU 502 communicates with the PS 501 through the Q Channel, which can involve signals such as requests (QREQ), accept (QACCEPT) and deny (QDENY). In example implementations, transitions for the Q channel can cause a transition to the power domain active bit that is driven by the power domain finite state machine. Logic in the master bridge responds to the transition by executing a fencing and draining operation, and then it completes the handshake with the PS 501, which ultimately returns an acknowledgement to the PMU through the Q accept signal.

For each power domain in the NoC, the PS maintains a Power Domain State Machine that provides high-level sequencing of the operations required for power removal and power restoration. The PDF_SM drives the Q-channel interface (QREQ/QACCEPT/QDENY/QACTIVE) to the PMU in conjunction with driving signals to elements in the NoC needed to coordinate power sequencing activity. The signals may be mapped into the same power domain as the PMU (e.g. always on—at a minimum with respect to all NoC power domains), and depending on the desired implementation, can be co-located with the PMU, although it is also possible to map the PDF_SM into the power domain it is managing.

In example implementations, the PS can include aggregation logic to combine acknowledgment signals and wake request signals returned from NoC elements. This logic is combinatorial and generally distributed in the design to minimize wiring impact, co-located where possible in the power domain of the signals being aggregated, though some gates may live in the PMU domain (particularly those driving QACTIVE).

Figure 5B:
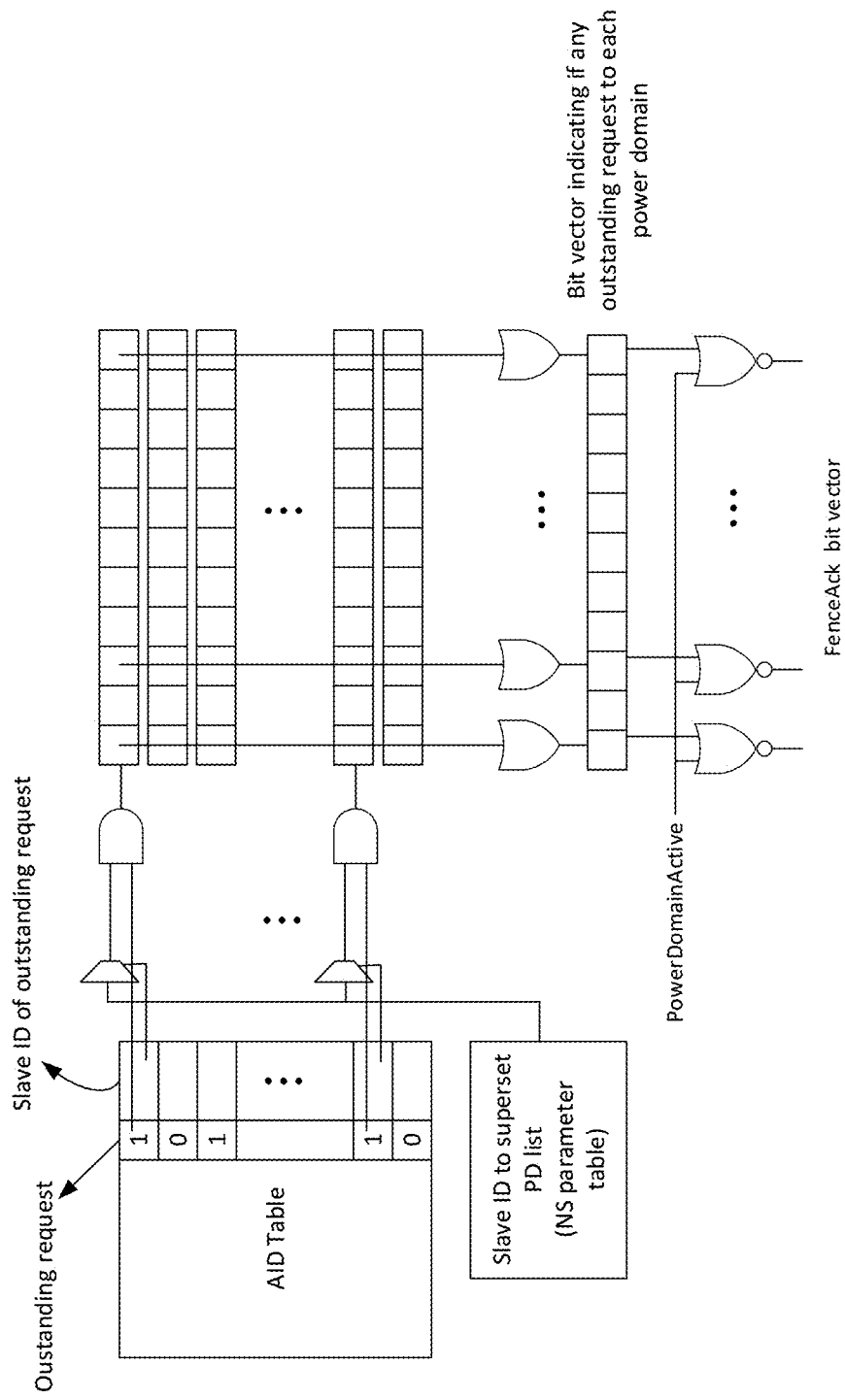
FIGS. 5(b) and 5(c) illustrate example implementations of a master bridge draining response.

FIG. 5(b) illustrates an example implementation of a master bridge draining response. In addition to fencing requests to power gated domains, the master bridge is also required to drain responses for all outstanding requests to any power domain which needs to be gated. Before a PD can be gated by the PS, all masters in the system confirm that responses for all outstanding requests to that PD have been completed. This functionality is also implemented in the master bridge using the outstanding transaction tracking tables. FIG. 5(b) illustrates the schematic of the draining functionality.

The outstanding transaction table is a register based structure and hence it is possible to do a combinatorial decode status of requests outstanding to different slaves and PDs associated with them. Further detail of the outstanding transaction table is provided with respect to FIG. 7. Thus in example implementations, the effect of the draining function is to hold off all acknowledgments of power down requests until the master bridge can confirm that the request will not corrupt pending transactions.

Figure 5C:
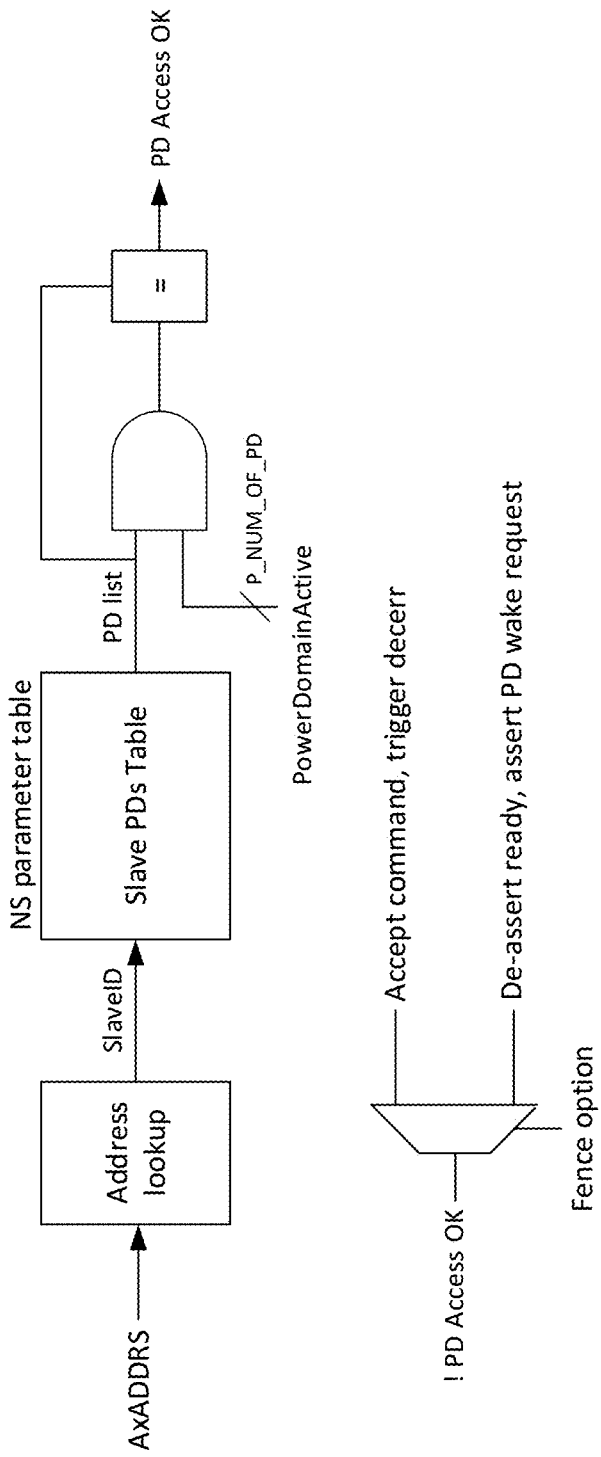

FIG. 5(c) illustrates an example implementation of a master bridge fencing response. As illustrated in FIG. 5(c), the initiators are configured to fence traffic such that newly arriving transactions are blocked, wherein based on transactions that are blocked by address, some transactions are fenced while others are allowed to proceed.

As illustrated in FIG. 5(c), the example implementations may configure fencing to stall the transaction making a wake request. The wake request is turned into a signal that requests to wake up the power domain corresponding to each active bit in the bit vector, and is sent to the PDFSMs. To initiate fencing, the PDF_SM converts PD_Active to 0 and then waits for a fence_ack from the master bridge, which indicates the completion of the fencing or draining function. The inversion of the result of an AND gate operation on the PD_Active signal and PD_Dep signal is applied, with a 1 indicating that the master bridge must fence the transaction.

In an example implementation, power domain dependencies can also be predicted by the PS by determining what power domains can be powered down without impacting to power traffic. In another example implementation, given a power profile the PS can also determine what can be turned on to avoid interrupting traffic. The power profile can be displayed during a simulation for a NoC designer, or can be utilized to generate HW functions in silicon that can generate the information for the intended power state (e.g., signal additional power domains that can be powered down/powered on or what should be powered on).

FIG. 6 illustrates an address table in accordance with an example implementation. In example implementations, the master bridge facilitates functionality based on the address table. The power specification and traffic specification are parsed into an encoded interface used into master bridge interfaces to make the fencing determination.

The address table can include the base address, mask, routing information, power domain dependencies. Power domain dependencies can involve a bit vector, having one bit per power domain (e.g. 1 indicates dependencies, 0 indicates independent). In example implementations, when a transaction containing an address arrives at the host interface of the master bridge, the master bridge refers to the table, utilizes the base address and mask to determine which address to forward the transaction, and determines the routing information for determining how the packet is to be formed.

In example implementations of a NoC, a transaction arrives at a host interface of a master bridge. The transaction contains an address, whereupon the host interface refers to the table as illustrated in FIG. 6, uses the base address and mask to determine which address the transaction should be forwarded, determines the routing information and determines how the packet is to be formed for transmission. From the power domain dependency vector, the power domain (PD) dependencies are analyzed and compared against signaling from the power domain state machine (PD_Active), and compares the PD dependency from the table against the signaling as illustrated in FIG. 4(b). In an example of PD_Active, the signal can be a single bit where 1 indicates that the PD is active/available, and 0 PD is inactive/not available. From this information, the master bridge can infer which power domains that are required are currently inactive and therefore require action for handling the transaction (e.g. fencing).

Each of the master bridges can provide a fence acknowledgement signal (fence_ack), which can be utilized as an input that enables a transition to the next state. Each PDFSM generates a pd_active signal that is connected to one or more master bridges. Each master bridge synchronizes the pd_active signal to its own local clock. Upon recognizing a transition in the locally synchronized version of pd_active, each master bridge initiates fencing and completes the draining of outstanding transactions (pd_active 1->0), or ceases fencing (pd_active 0->1).

Upon completion of fencing and draining, each master bridge drives a fence_ack_n signal 1->0 and a fence_done_n signal 0->1. Upon ceasing fencing, each master bridge drives fence_ack_n 0->1 and fence_done_n 1->0.

In example implementations, the fence_ack_n signals from all master bridges are combined via an OR function to produce a signal fence_ack_asserted_n which is sent to the corresponding PDFSM, and the PDFSM synchronizes this signal to its own clock. The state machine is designed to wait until after it drives pd_active 1->0 to determine the locally synchronized version of fence_ack_aggregated_n transition 1->0 before advancing to the next state. Further, the fence_done_n signals from all master bridges can be combined via an OR function to produce fence_ack_deasserted_n which is sent to the corresponding PDFSM, and it synchronizes this signal to its own clock. The state machine is designed to wait after it drives pd_active 0->1 to see its locally synchronized version of fence_ack_deasserted_n transition 1->0 before advancing to the next state.

In example implementations, when one or more master bridges exist in power domains that are rendered inactive (e.g., clock stopped or power removed), the bridges can no longer properly respond to pd_active with acknowledgments via fence_ack_n and fence_done_n. To avoid blocking progress of the PDFSM, the values of fence_ack_n and fence_done_n driven by the bridges are set to 0, removing them from participating in the handshake. In such a situation, there is also a hazard when the master bridges are woken up. This hazard arises from the fact that there is propagation delay between the transition of pd_active at the output of the PDFSM and the time it arrives and passes through synchronizing registers in each master bridge. There is a corresponding delay in return paths of fence_ack_n and fence_done_n. From the time a master bridge wakes back up for the duration of this propagation delay, the master bridge and the PD FSM could improperly advance states.

To protect against the above hazard, a local timer is implemented in the PDFSM at the state transition points where it is vulnerable. The local timer forces the PDFSM to wait for the duration of the propagation delay to ensure that synchronization between the PDFSM and the master bridges participating in the handshake has been restored before the PDFSM interprets the values received on fence_ack_asserted_n and fence_ack_deasserted_n to determine whether or not to advance to the next state. Further examples of the state diagram for the PDFSM are provided with respect to FIG. 10.

FIG. 7 illustrates an example outstanding transaction table, in accordance with an example implementation. Each entry in the outstanding transaction table corresponds to an outstanding request and stores the locally unique ID of the NoC element to which the request is outstanding. A valid bit indicates if the entry is outstanding or unused. Transaction ID field in each outstanding transaction table entry is used to index a constant parameter table. This table produces a bit vector of system power domains with bits set for the superset of power domains through which responses from the NoC element return to the master. This vector is gated and qualified with the valid bit of the outstanding transaction table entry. Bit wise ORing of the active power domain vectors generated by each outstanding transaction table entry as illustrated in FIG. 5(b) produces a bit vector indicating power domains to which responses are outstanding in the outstanding transaction table. This vector is then bitwise ORed with the PD Active bit vector to generate the fence_ack handshake signal in response to a power gating request for a PD from the PS. Thus in example implementations, when a transaction is requested for the power domain, the pending transaction power domain dependencies are consulted through the table of FIG. 7. A signal is provided to the PDFSM when no pending transactions would be interrupted by the requested transition in power domain status.

In an example draining function based on FIG. 7, when a transaction is forwarded through the NoC, the outstanding transaction tables is consulted which includes the PD dependency vector. In an example flow, the VALID flag is consulted to determine if the entry is currently active (e.g. response acknowledgement of zero indicates that the transaction is closed). Based on the Valid flag and the PD dependency, a list of PD dependencies is created, wherein OR logic is applied on the list of PD dependencies to identify all of the PD dependencies outstanding.

OR logic is applied on the PD dependencies and the PD_Active signal to determine if draining is complete. If the resulting signal is zero, then draining has completed and no outstanding transactions for the power domain are required.

Through use of the table of FIG. 7, the PS can be configured to generate traffic driven power domain state requirements with dynamic feedback from master bridges. Each master bridge can be configured to track power domain dependencies of each pending transaction based on the information of FIG. 7. A vector is generated by ORing together all the valid entries in the outstanding transaction table. The vector describes all the power domains that must be active for all currently outstanding transactions originating from the particular master bridge to complete successfully. The vectors correspondingly also indicate power domains for which no outstanding transactions have any dependency. The vectors from each master bridge in the NoC are put through an OR function as illustrated in FIGS. 8(a) and 8(b) to produce a combined vector that describes the collective power domain dependencies of all outstanding traffic in the NoC.

Figure 8A:
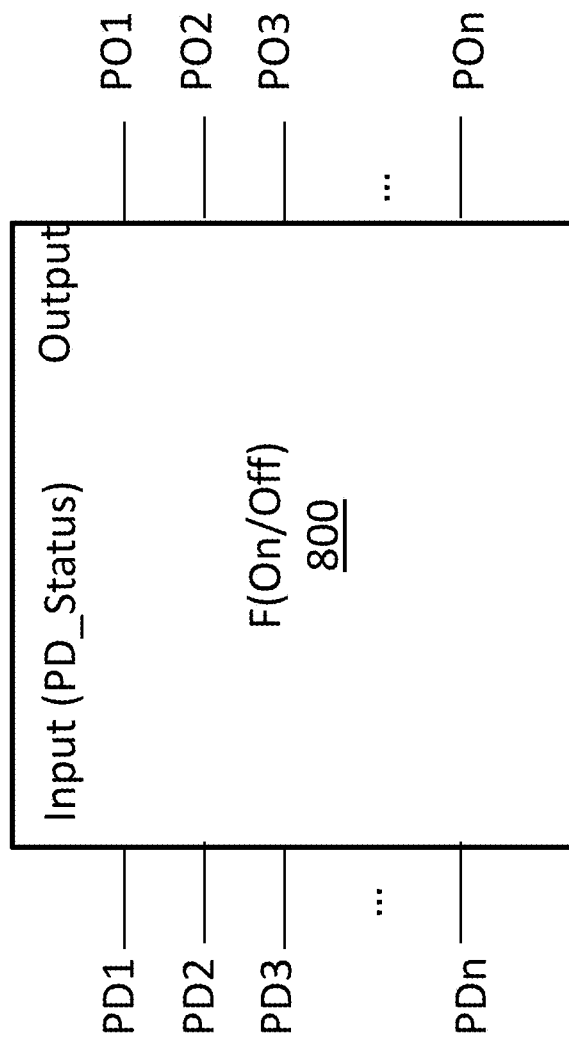
FIGS. 8(a) and 8(b) illustrate an example function for correcting a power domain status in accordance with an example implementation.
Figure 8B:
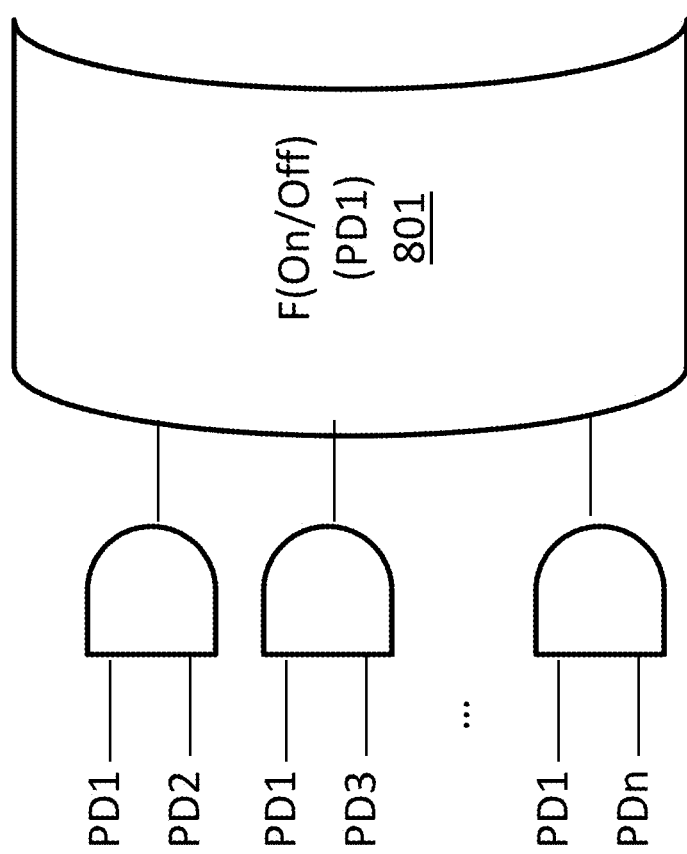

FIGS. 8(a) and 8(b) illustrate an example function for correcting a power domain status in accordance with an example implementation. Specifically, the function is utilized to define PD_Active, or the power domains that should remain active. As illustrated in FIG. 8(a), the input is a bit vector of PD_Status, with one bit per power domain that indicates the status as illustrated, for example, in FIG. 4(b). Based on the input status, the function produces an output that indicates which of the power domains can be turned off, and also indicates that what power domains should be left on.

In FIG. 8(a), the F(On/Off) 800 provides an output so that for a given off state, find power domains with output that only terminates to an off state power domain, and further for given on states, find power domains that need to be turn on based on the power domains that are on. For determining As illustrated in FIG. 8(b), the function 801 identifies all pairs of dependent power domains and haves the status of the power domains entered into AND gates. The results of each of the AND gates are then placed into an OR gate. Thus, if the end result is 1, then the power domain should be left on as there is a dependent power domain that is active, and if the end result is 0, then the power domain can be turned off. Thus, the function can be constructed as hardware gates, or in other example implementations, the function can be implemented as a lookup table in a ROM for a microcontroller, a logic into software for ASIC, or even built into silicon. Hardware is generated based on routing, traffic assignment, API, etc. By having an OR function for the outstanding PD dependency vectors, example implementations produce a summary vector across all power domains, with a result of 1 for the existence of active traffic that depends on the PD to be active for completion, and 0 for an idle PD that does not need to remain awake. Such results can be implemented in real time.

The example function of FIGS. 8(a) and 8(b) can be run in parallel with fencing/draining functions as described herein, wherein the bridge logic can be used to wake up power domains as needed.

Figure 9:
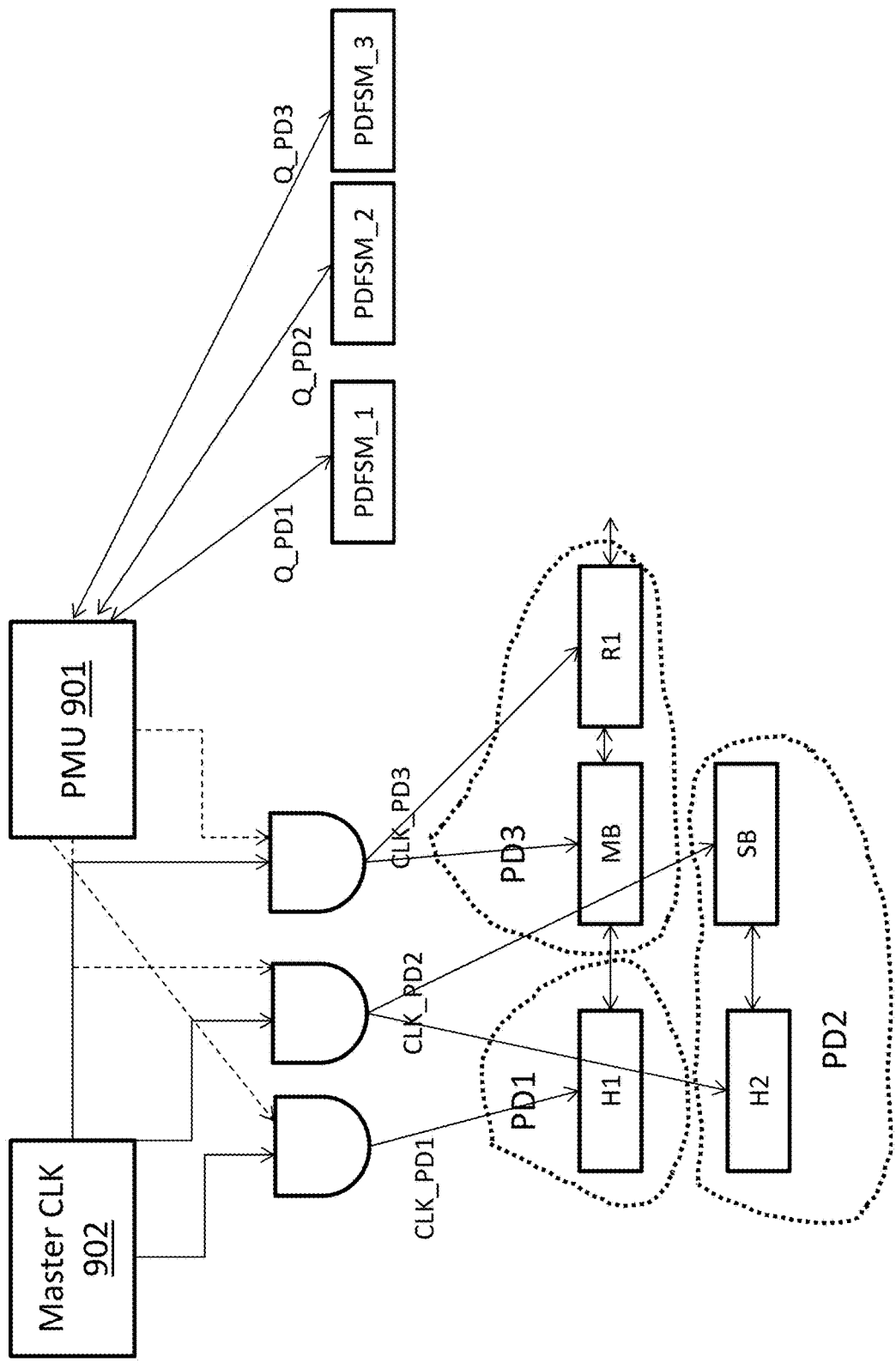
FIG. 9 illustrates an example architecture involving power domains having different clock domains.

In example implementations, clock gating functions can also be implemented to facilitate shut down across different clock domains. Clock functions can also be managed for handling other clock issues such as wire delay. FIG. 9 illustrates an example architecture involving power domains having different clock domains, in accordance with an example implementation. In the example of FIG. 9, a master clock 902 manages the clock domains CLK_PD1, CLK_PD2, CLK_PD3 for power domains PD1, PD2 and PD3. PMU 901 manages the states of the PDFSM as illustrated in FIGS. 4(a) and 4(b). Based on the signaling, PMU 901 is also configured to conduct clock gating and turn off clocks by sending a signal to each of the clock gates. With the configuration of FIG. 9, flexibility can be provided in the case where traffic needs to be interrupted in a power domain for some reason (e.g. thermal event, overheating due to intensive calculation, etc.), which necessitates the shut down and clock gating of the power domain. Power is saved by stopping the clock to the power domain, which also isolates that power domain from the rest of the NoC and keeps the NoC idle with respect to the PD that is shut down. In the example of FIG. 9, clock gating is managed in the Q-Channel level to manage clock gating.

As illustrated in FIG. 9, wire delay and other aspects can cause the receipt by bridges to be different. Thus, acknowledgements (ACK) can be aggregated in example implementations when receipt by bridges is expected to be asynchronous or if the bridges are operating at a different clock from the associated PDFSM. The aggregation of acknowledgements can be used to facilitate asynchronous handshakes for the state transitions of the PDFSM.

In example implementations, a hysteresis counter can be implemented for power management. In such example implementations, when a power domain has been idle for a threshold of cycles, the PS can be configured to conduct a clock gate which functions like a virtual power down, and can then turn off the clock to save power.

The ACKs are aggregated to move the state in PDFSM, as the state transition may rely on ACK. The aggregated ACKs are to be used internally by the bridge and synchronized to the local clock domain as the local clock domain may contribute to skew, and a reset signal is provided to all devices.

Figure 10:
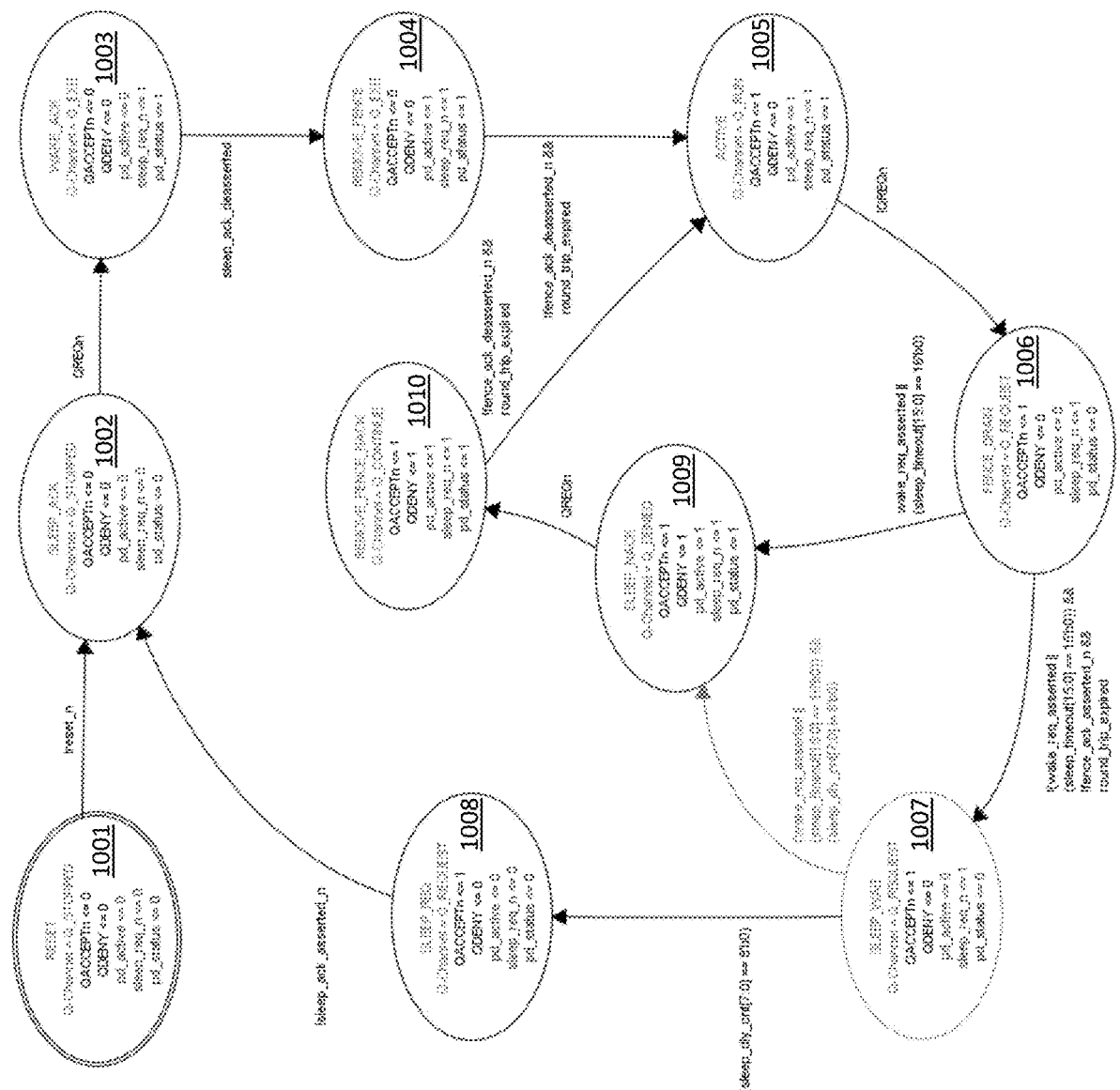
FIG. 10 illustrates an example state diagram for the power domain finite state machine, in accordance with an example implementation.

FIG. 10 illustrates an example state diagram for the PDFSM, in accordance with an example implementation. In the example provided in FIG. 10, states of the PDFSM can include reset 1001, sleep acknowledgement (Sleep_Ack) 1002, wake up acknowledgement (Wake_Ack) 1003, Remove Fence (Remove_Fence) 1004, Active 1005, Remove Fence Non Acknowledgement (Remove_Fence_Nack) 1010, Sleep Non acknowledgement (Sleep_Nack) 1009, fence drain (Fence_drain) 1006, Sleep Wait (Sleep_Wait) 1007, and Sleep Request (Sleep_REQ) 1008.

In an example implementation for the power down request, the PMU drives the power down request signal, and the PS determines if the power down request can be accepted or not based on the power domain dependencies. PMU holds the QREQn signal for the power domain low until the PS responds by asserting either power down accepted (QACCEPT) or denied (QDENY) for the power domain. The PS returns to the normal operation by setting QREQn to be high for the power domain and waiting for either the QACCEPT for the power domain to be high or QDENY to be low before initiating a new power down request for the power domain. When a power domain is powered down, the QREQ, QACCEPT, QDENY and QACTIVE signal for the power domain is set to zero. Wake Requests are initiated by the PS by driving the QACTIVE signal to be high for the requested power domain.

In the example of FIG. 10 for powering up a power domain, the PMU drives the QREQn signal to be high for the selected power domain. The PS acknowledges the signal by driving QACCEPT to be high for the power domain when logic is safely restored for the normal operation.

In the example as depicted for FIG. 10, the power down sequence for the PDFSM for a power domain in the active state is stated with QREQ, pd_active and QACCEPT set to high for the power domain, and QDENY being set to low. The PMU requests a power down by driving QREQ for the requested power domain to be low.

If the NoC elements are not ready to accept the new power down request (e.g. some fence_ack_n and/or sleep_ack_n signals from NoC elements remain asserted, indicating that fencing is being conducted), the request is not acknowledged by driving QDENY to be high for the power domain, thereby advancing the PDFSM to the SLEEP_NACK state. Otherwise, the PS initiates the power down procedure by driving pd_active to be low for the power domain and by advancing the PDF SM to the FENCE_DRAIN state 1006.

During the FENCE_DRAIN state 1006, the NoC master elements observe the 1->0 transition on pd_active for the power domain and initiate fencing and draining depending on the desired implementation. The NoC master elements provide a signal completion back to the PS by asserting fence_ack corresponding to the power domain and the NoC master element. When all NoC master elements of the power domain have asserted such a signal, the PDFSM advances to the SLEEP_WAIT state 1007.

During the SLEEP_WAIT state 1007, the PS is configured to wait for a Sleep Delay Counter to expire before moving on to the SLEEP_REQ state 1008. The purpose is to allow additional time for traffic to drain from the NoC when protocols do not allow for all of the master bridges to definitively determine when all of the outstanding transactions have completed (e.g., NSIP streaming protocol). This state may be bypassed directly to SLEEP_REQ 1008 when such conditions do not exist.

During the SLEEP_REQ state 1008, the PS asserts sleep_req for the power domain, which is transmitted to all NoC elements within the affected power domain. If the fence drain does not complete within a timeout window, the PS will move to SLEEP_NACK 1009 to return NACK to the PMU by sending QDENY for the power domain. The NoC element waits until the NoC element is safely idle (e.g. no traffic pending).

The NoC element de-asserts the link_available signal to upstream interfaces to prevent new traffic from arriving. Such signals only need to be connected for interfaces crossing the power domain boundary. The NoC element asserts sleep_ack to signal power down readiness to the PS. When all NoC elements have asserted sleep_ack, the PS advances to SLEEP_ACK state 1002.

During the SLEEP_ACK state 1002, the PS changes QACCEPT for the power domain to be low, which indicates power down readiness. During this state, the PMU may remove clocks.

To conduct power up for the power domains when starting in the SLEEP_ACK state 1002, QREQ, QACCEPT, reset_pd and pd_active are all low for the power domain. The PMU signals clock/power restoration by driving QREQ to be high for the power domain. Clocks and power are configured to be up and stable before the PMU drives the signal. The PS advances to the WAKE_ACK state 1003.

During the WAKE_ACK state 1003, the PS de-asserts sleep_req for the power domain, as well as reset_pd. The PS waits for sleep_ack_deasserted to go active for the power domain to confirm all elements in the power domain are ready for activity before advancing to the REMOVE_FENCE state 1004.

During the REMOVE FENCE state 1004, the PS asserts pd_active to the NoC to inform the NoC master elements that they should cease fencing and draining for the power domain. PS waits for fence_ack_deasserted to go active for the power domain to confirm all masters have ceased fencing for the domain before advancing to the ACTIVE state 1005.

During the ACTIVE state 1005, the PS drives QACCEPT to be high for the power domain, thereby completing acknowledgment of the power up and indicating logic is ready for normal operation.

Figure 11:
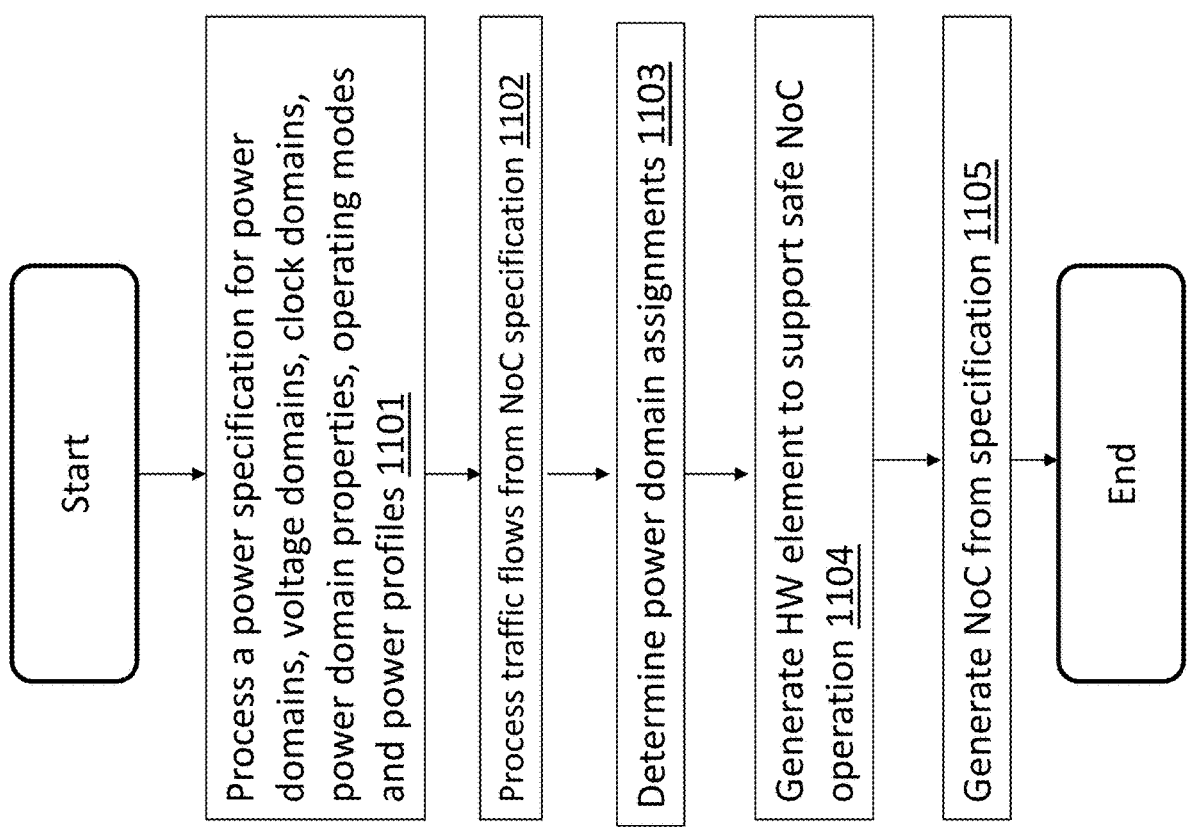
FIG. 11 illustrates an example flow diagram in accordance with an example implementation.

FIG. 11 illustrates an example flow diagram in accordance with an example implementation. Specifically, FIG. 11 illustrates a method for generating a Network on Chip based system having a plurality of power domains, a plurality of voltage domains, and a plurality of clock domains as illustrated in FIG. 4(*a*), through processing of a power specification for defined power domains, voltage domains and clock domains, the power domains, voltage domains and the clock domains associated with physical locations and dynamic voltage levels/frequencies as illustrated in FIG. 4(*a*). The power domains, clock domains, voltage domains along with the voltage levels/frequencies and physical locations can be defined in the specification in accordance with the desired implementation.

At 1101, the power specification is processed for one or more of power domains, voltage domains, clock domains, power domain properties, operating modes, and power profiles. Such processing can include configuring power domains to be always on, autowake capable, assigned to a voltage domain, and so on in accordance with a desired implementation. The processing of the power profiles can involve determining the distinct operating modes in FIG. 4(*a*) for the PDFSM so as to indicate the state of all power/voltage/clock domains in the system. Power profiles may be specified via a combination of a list of power domains with explicitly specified ON/OFF state and power domain dependencies, and also absent pre-defined power profiles, a default power profile set of all possible combinations of power domain on/off status applies.

At 1102, the traffic flows are processed from the NoC specification which can be in the form of a traffic specification or other implementation. Such processing can involves extracting connectivity and bandwidth requirements from the specification and generating a routing solution that meets these basic requirements.

At 1103, the power domain assignments are determined based on the specified power domains from the power specification, the traffic flows, the NoC element positions, and so on, in a manner that ensures uninterrupted traffic flow in each of the power profiles while meeting all optimization rules.

At 1104, a hardware element is generated to support safe NoC operation. The hardware element can be in the form of a PS managing the NoC, wherein the generation can include generating instructions for the PS to manage the NoC. Thus, based on the power domain assignment of NoC elements, safe power profile transitions are managed at power domain level instead at NoC element level. The PS and PDFSM can be generated as hardware to support safe NoC operation in any power profile and through transition between power profiles.

At 1105, the NoC is generated from the specification, which involves generating instructions for a chip to function as a NoC, or manufacture of the NoC according to the specification, or through compiling of the RTL for execution by the NoC, or other methods depending on the desired implementation. The flow of FIG. 11 can be implemented in the form of instructions for an apparatus such as a design tool or a computer implementing a design tool for a NoC, and executed by one or more processors.

Figure 12:
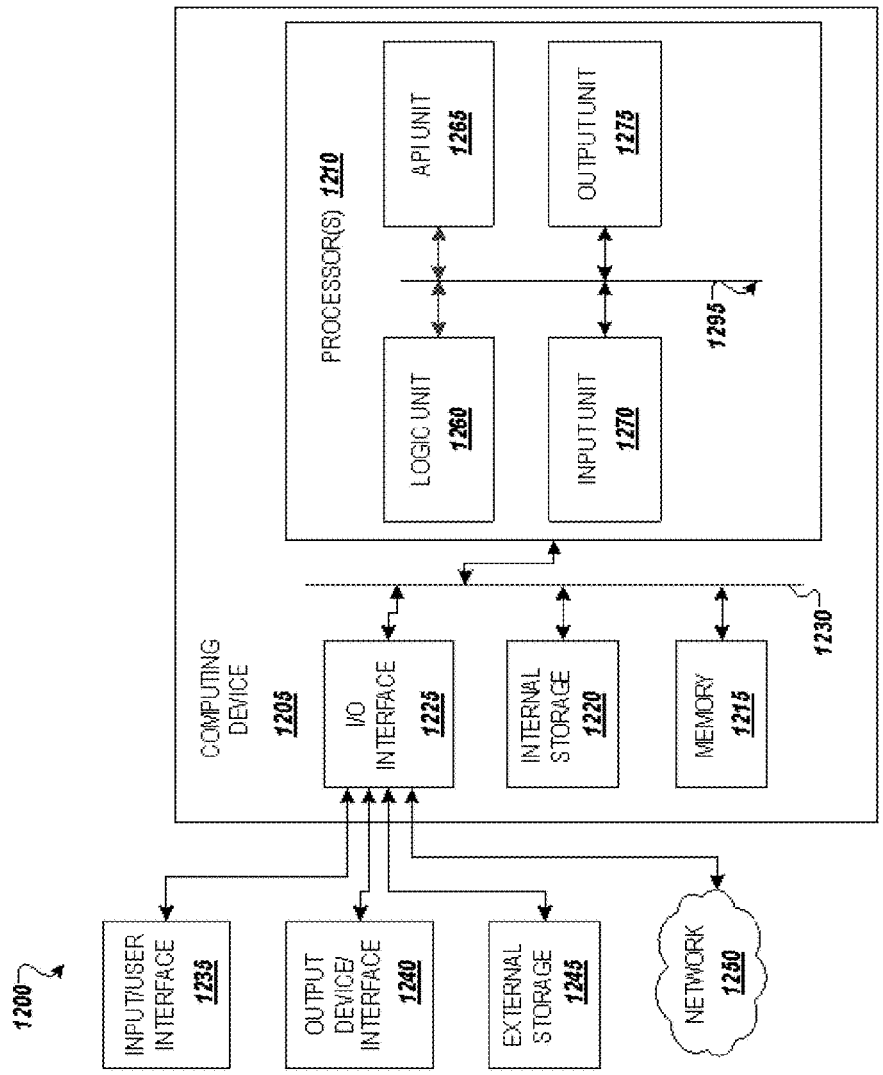
FIG. 12 illustrates an example

FIG. 12 illustrates an example computing environment with an example computer device suitable for use in some example implementations, such as an apparatus configured to execute instructions to generate the PS, NoC, and PMUs from the NoC or system specification as described herein. The instructions can be executed to generate and manufacture the hardware elements, or to generate an RTL that can be implemented onto hardware elements.

Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computer device 1205.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method for a Network on Chip (NoC), comprising:
managing fencing and draining per address range in the Network on Chip (NoC) with a power supervisor;
wherein the managing of fencing per address range comprises:
  managing an address lookup table indicative of which power domains must be on for successful transmission of a transaction, wherein the address lookup table is consulted by each of a plurality of elements of the NoC initiating traffic, and wherein a result of the consulting is compared against a dynamic power domain status;
  wherein for required power domains from the each power domain of the NoC that are off, the each of the plurality of elements initiating traffic is configured to reject a transaction or hold the transaction while an autowake request is signaled to return the required power domains to change to an ON status, and
determining at the power supervisor, given a power profile of the NoC, which power domains that are currently ON could be safely turned off without interrupting traffic or which power domains that are currently OFF are to be turned on to avoid interrupting the traffic.

2. The method of claim 1, wherein the managing draining per address range comprises:
maintaining an outstanding transaction table with dependent power dependencies,
for a requested transition in dynamic power domain status, consult pending transaction power domain dependencies from the outstanding transaction table; and
signaling a power domain finite state machine managed by the power supervisor when no pending transactions would be interrupted by the requested transition in power domain status.

3. The method of claim 1, further comprising:
determining at the power supervisor, from one or more power domains that are on, which other power domains must be on to sustain traffic flow; and
determining at the power supervisor, from a given traffic flow, which power domains are to be on.

4. The method of claim 1, further comprising:
determining, at the power supervisor, traffic driven power domain state requirements based on feedback from master bridges of the NoC, wherein each of the master bridges tracks power domain dependencies of each pending transaction.

5. A non-transitory computer readable medium, storing instructions for a Network on Chip (NoC), comprising:
managing fencing and draining per address range in the Network on Chip (NoC) with a power supervisor;
wherein the managing of fencing per address range comprises:
  managing an address lookup table indicative of which power domains must be on for successful transmission of a transaction, wherein the address lookup table is consulted by each of a plurality of elements of the NoC initiating traffic, and wherein a result of the consulting is compared against a dynamic power domain status;
  wherein for required power domains from the each power domain of the NoC that are off, the each of the plurality of elements initiating traffic is configured to reject a transaction or hold the transaction while an autowake request is signaled to return the required power domains to change to an ON status, and
determining at the power supervisor, given a power profile of the NoC, which power domains that are currently ON could be safely turned off without interrupting traffic or which power domains that are currently OFF are to be turned on to avoid interrupting the traffic.

6. The non-transitory computer readable medium of claim 5, wherein the managing draining per address range comprises:
maintaining an outstanding transaction table with dependent power dependencies,
for a requested transition in dynamic power domain status, consult pending transaction power domain dependencies from the outstanding transaction table; and
signaling a power domain finite state machine managed by the power supervisor when no pending transactions would be interrupted by the requested transition in power domain status.

7. The non-transitory computer readable medium of claim 5, the instructions further comprising:
determining at the power supervisor, from one or more power domains that are on, which other power domains must be on to sustain traffic flow; and
determining at the power supervisor, from a given traffic flow, which power domains are to be on.

8. The non-transitory computer readable medium of claim 5, the instructions further comprising:
determining, at the power supervisor, traffic driven power domain state requirements based on feedback from master bridges of the NoC, wherein each of the master bridges tracks power domain dependencies of each pending transaction.

9. An apparatus comprising:
memory to store data;
a processor, coupled to the memory, to execute one or more instructions based on the stored data, to:
  manage fencing and draining per address range in a Network on Chip (NoC) with a power supervisor, wherein managing of the fencing per address range comprises:
  managing an address lookup table indicative of which power domains must be on for successful transmission of a transaction, wherein the address lookup table is to be consulted by each of a plurality of elements of the NoC initiating traffic, wherein a result of the consulting is to be compared against a dynamic power domain status, wherein for required power domains from the each power domain of the NoC that are off, each of the plurality of elements initiating traffic is to be configured to reject a transaction or hold the transaction while an autowake request is signaled to return the required power domains to change to an ON status; and
  determine at the power supervisor, given a power profile of the NoC, which power domains that are currently ON could be safely turned off without interrupting traffic or which power domains that are currently OFF are to be turned on to avoid interrupting the traffic.

10. The apparatus of claim 9, wherein managing the draining per address range comprises:
    maintaining an outstanding transaction table with dependent power dependencies;
    for a requested transition in dynamic power domain status, consult pending transaction power domain dependencies from the outstanding transaction table; and
    signaling a power domain finite state machine managed by the power supervisor when no pending transactions would be interrupted by the requested transition in power domain status.

11. The apparatus of claim 9, wherein the processor is to further cause:
    determining at the power supervisor, from one or more power domains that are on, which other power domains must be on to sustain traffic flow; and
    determining at the power supervisor, from a given traffic flow, which power domains are to be on.

12. The apparatus of claim 9, wherein the processor is to further cause determining, at the power supervisor, traffic driven power domain state requirements based on feedback from master bridges of the NoC, wherein each of the master bridges tracks power domain dependencies of each pending transaction.

* * * * *